US012781070B2

(12) United States Patent
Chiu et al.

(10) Patent No.: US 12,781,070 B2
(45) Date of Patent: Nov. 3, 2026

(54) WHITE INKJET INK COMPOSITIONS COMPRISING HOLLOW COMPOSITE PARTICLES

(71) Applicant: Inner Mongolia Xianhong Science Co., Ltd., Hohhot (CN)

(72) Inventors: Kwan Yeung Chiu, Hong Kong (CN); Kin Man Ho, Hong Kong (CN); Siu Sun Chan, Hong Kong (CN); Kwai Sang Ng, Hong Kong (CN); Liangdong Liu, Hong Kong (CN); To Ngai, Hong Kong (CN)

(73) Assignee: INNER MONGOLIA XIANHONG SCIENCE CO., LTD., Hohhot (CN)

( * ) Notice: Subject to any disclaimer, the term of this patent is extended or adjusted under 35 U.S.C. 154(b) by 783 days.

(21) Appl. No.: 18/133,545

(22) Filed: Apr. 12, 2023

(65) Prior Publication Data

US 2023/0332006 A1 Oct. 19, 2023

Related U.S. Application Data

(60) Provisional application No. 63/330,789, filed on Apr. 14, 2022.

(51) Int. Cl.

| | |
|---|---|
| ***C09D 11/322*** | (2014.01) |
| ***C08F 220/12*** | (2006.01) |
| ***C08K 3/22*** | (2006.01) |
| ***C09D 11/023*** | (2014.01) |

(52) U.S. Cl.

CPC .......... *C09D 11/322* (2013.01); *C08F 220/12* (2013.01); *C09D 11/023* (2013.01); *C08K 2003/2241* (2013.01)

(58) Field of Classification Search

CPC .................................................... C09D 11/322

See application file for complete search history.

(56) References Cited

U.S. PATENT DOCUMENTS 4,880,465 A * 11/1989 Loria ..................... C09D 11/30 347/100

6,930,135 B2 8/2005 Chung et al.

(Continued)

FOREIGN PATENT DOCUMENTS

EP 1388578 A1 2/2004

EP 1818373 A2 8/2007

(Continued)

OTHER PUBLICATIONS

Chen, T.; Colver, P. J.; Bon, S. A. F. Adv. Mater. 2007, 19, 2286-2289. (Year: 2007).*

(Continued)

*Primary Examiner* — Michael F Pepitone

(74) *Attorney, Agent, or Firm* — Kam Wah Law

(57) ABSTRACT

This invention relates to a method of making white hollow composite particles by one-step Pickering mini-emulsion polymerization and their application in making white inkjet ink compositions. Each of the particles comprises white inorganic particles; a crosslinked polymer shell; and a hollow core inside the crosslinked polymer shell, and wherein the inorganic particles adhere on the surface of the crosslinked polymer shell. The hollow composite particles have an average diameter ranging from 200 to 1,000 nm and a high degree of whiteness. Furthermore, the structure of the particles remains intact even after they are subjected to repeated centrifugation, decantation, shearing or a combination thereof, which makes them suitable for inkjet ink application. An inkjet ink composition comprising the white hollow composite particles has not only whiteness and shearing stability comparable to those of inkjet ink compositions comprising a traditional white pigment, but also a better dispersion stability than the latter.

20 Claims, 4 Drawing Sheets

(56) References Cited

U.S. PATENT DOCUMENTS

| | | | |
|---|---|---|---|
| 6,989,054 B2 | 1/2006 | Tanabe et al. | |
| 7,850,774 B2 | 12/2010 | Oriakhi | |
| 7,901,501 B2 | 3/2011 | Kobayashi | |
| 8,008,368 B2 | 8/2011 | Mochizuki et al. | |
| 9,803,093 B2 | 10/2017 | Katsuragi | |
| 9,873,810 B2 | 1/2018 | Takahashi et al. | |
| 9,878,920 B2 | 1/2018 | Zhao et al. | |
| 9,981,857 B2 | 5/2018 | Zhao et al. | |
| 2006/0275606 A1 | 12/2006 | Mizutani | |
| 2007/0259986 A1 | 11/2007 | Elwakil et al. | |
| 2010/0105807 A1 | 4/2010 | Sugita et al. | |
| 2010/0261803 A1* | 10/2010 | Bismarck .............. | C08F 292/00 521/76 |
| 2011/0104495 A1 | 5/2011 | Lalgudi et al. | |

FOREIGN PATENT DOCUMENTS

| | | |
|---|---|---|
| WO | 2012070032 A2 | 5/2012 |
| WO | 2016064471 A1 | 4/2016 |

OTHER PUBLICATIONS

Huo, J.; Marcello, M.; Garai, A.; Bradshaw, D. Adv. Mater. 2013, 25, 2717-2722. (Year: 2013).*

Huo, J.; Marcello, M.; Garai, A.; Bradshaw, D. Adv. Mater. 2013, 25, 2717-2722; Supporting Information. (Year: 2013).*

17) Yuanhua Li et al., titled "Deposited Nanoparticles Can Promote Air Clogging of Piezoelectric Inkjet Printhead Nozzles," Langmuir 2019, 35, 16, 5517-5524.

Examination Report issued on Jan. 31, 2026 by the Chinese Patent Office for the counterpart Chinese Patent Application No. 202310379984.8.

Study of Titania-Stabilized by Pickering Polymerization Mechanism, Zhao Yongliang, Full-text Database of Excellent Master's Theses in China, Engineering Technology Series I (Monthly), 2012, No. 01, Jan. 15, 2012, pp. B014-114.

Fabrication of Polymer Microspheres Using Titania as a Photocatalyst and Pickering Stabilizer, Xiaomei Song et al., Langmuir, 2009, 25 (8), pp. 4443-4449.

* cited by examiner

WHITE INKJET INK COMPOSITIONS COMPRISING HOLLOW COMPOSITE PARTICLES

CROSS-REFERENCE TO RELATED APPLICATIONS

This is a non-provisional application claiming the benefit of U.S. Provisional Application No. 63/330,789, filed Apr. 14, 2022, which is incorporated herein by reference in its entirety.

FIELD OF THE INVENTION

This invention relates to a method of making white hollow composite particles by one-step Pickering mini-emulsion polymerization, white hollow composite particles, and white inkjet ink compositions comprising thereof.

BACKGROUND OF THE INVENTION

Inkjet inks have been widely used in a variety of applications such as marking, labelling, visual arts, paint, undercoating, and so on. White inorganic pigments, such as titanium dioxide and zinc oxide, have been widely used as white colorants for the inkjet ink compositions because of their high refractive index which in turn provides a high hiding power. An inkjet ink with a high hiding power is able to provide effective masking of the underlying color or image, rendering the underlying color less visually perceptible to human eyes. To achieve good hiding power, an inorganic pigment should have a high refractive index and a high scattering power. The scattering power generally depends on the particle size of the inorganic pigment. For white pigments, maximum scattering is generally observed at particle sizes ranging from 200 to 250 nm. The scattering power decreases at the size below 200 nm, dramatically drops at the size below 100 nm, and further significantly drops at the size below 20 nm at which the pigment becomes almost translucent.

When prints are produced through printing by an inkjet printer using a white inkjet ink composition comprising a white inorganic pigment as a colorant, the white inorganic pigment, such as titanium dioxide (density >4 $gcm^{-3}$), have a density substantially greater than the solvent (density <1 $gcm^{-3}$). Therefore, in a low viscosity inkjet ink composition (2-20 centipoise), and/or in a dilute inkjet ink composition (solids content <50%), such an inorganic pigment quickly settles out from the ink composition. Furthermore, the inorganic pigment is lack of the surface functional groups that allows an anchoring site for functional polymers or molecules to provide steric hindrance between the pigment particles. As the particle-particle attraction is larger than the repulsive forces between the particles, the pigment particles tend to aggregate, leading to precipitation and finally clogging of printer nozzle. As a result, the printed marking gives poor print quality and low degree of whiteness.

In general, a white inkjet ink composition is made by first dispersing the white pigment in a surfactant solution using a dissolver, followed by time consuming grinding process to form a pigment concentrate having viscosity between 100 and 10,000 centipoises to retard the precipitation rate of the pigment. The resulting pigment concentrate is then mixed with different types of binders to formulate an inkjet ink. If the inorganic pigment has poor compatibility with functional polymer binders present in the ink composition, the pigment in a white inkjet ink often results in much faster precipitation rate. Obvious phase separation can be observed after standing the inkjet ink at ambient temperature for few hours.

To solve the aforementioned problems, various attempts have been made to replace white inorganic pigment with either polymeric latexes or polymeric hollow particles or the like. Some examples of the white inkjet ink compositions include those disclosed in U.S. Pat. No. 4,880,465 (Videojet), U.S. Pat. No. 6,930,135 B2 (Rohm Haas), U.S. Pat. No. 8,008,368 B2 and U.S. Pat. No. 9,803,093 B2 (Ricoh). Although the use of the latexes or the hollow polymeric particles, greatly alleviate the settling problems associated with using inorganic pigments due to its low density, in which the presence of voids in the hollow particles provides even better light scattering, all of the inkjet ink compositions disclosed by the above patents can only be regarded as an opaque ink, not a white ink. The low degree of whiteness is mainly limited by the low refractive index of the polymeric materials. Besides, it has been reported that the latexes covered with cationic surfactants usually results in clogging of the nozzle plate, indicating that the latex particles may not be suitable for inkjet printing as disclosed in an article by Yuanhua Li et al., titled "Deposited Nanoparticles Can Promote Air Clogging of Piezoelectric Inkjet Printhead Nozzles," *Langmuir* 2019, 35, 16, 5517-5524.

Various studies have also been investigated to provide the stabilization of the inorganic pigment via surface modifications of polymers or inorganic nanoparticles or latexes. For example, Japanese Patent Laid-Open No. 145570/1994, Japanese Patent Laid-Open No. 348513/2002, European Pat. No. EP1388578 A (Dainippon ink), U.S. Pat. No. 7,850,774 (HP), U.S. Pat. Appl. Pub. No. 2007/0259986 A1 (DU PONT), U.S. Pat. Appl. Pub. No. 2010/0105807 A1 (INCTEC), and U.S. Pat. No. 9,873,810 B2 (Toyo Ink), and WO2016064471 A1. Despite of the fact that the surface modification helps the pigment particles less susceptible to settling from the ink, the settling problem of white inkjet ink comprising an inorganic pigment with a larger particle size (e.g., 250 nm) and high density (e.g., >3 $gcm^{-3}$) is not solved.

Another approach to improve the settling problem of inorganic pigment is using two different modal distributions of pigment particles, latexes and combinations thereof. It is known that smaller size of particles is less subject to settling issue than larger size of particles because smaller size of particles has faster Brownian motion/diffusion. European Pat. No. EP1818373A2 disclosed an inkjet ink composition comprising a mixture of first inorganic pigment with a refractive index greater than 1.6 having an average particle size larger than 200 nm and second inorganic pigment having an average particle size between 40 nm and 90 nm. WO201270032A1 also disclosed an inkjet ink composition comprising a mixture of first inorganic pigment having a refractive index greater than 1.6 and a diameter of less than 100 nm and second polymeric particles having a low refractive index less than 1.5 and a diameter between 100 and 1,000 nm. However, the settling problem of the white inkjet ink disclosed in the above patents is not totally solved, and the degree of whiteness is largely dependent on the sizes and weight ratios between latexes and pigment particles.

Attempts to reduce the density of the inorganic pigment, such as titanium dioxide, have received great attention. U.S. Pat. Appl. Pub. No. 2006/0275606A1 disclosed a method by first adsorbing titanium alkoxide on the surface of core template, followed by hydrolysis of the titanium alkoxide to form titanium dioxide on the core template. European Pat. No. 1818373A2 also disclosed four methods of making inorganic-organic hollow particles, including organic bead template, emulsion template, spray injectant thermal decomposition method, and electrostatic spray method. The size of the hollow particles can be controlled by different types of methods. To obtain low density of the highly porous pigment particles, WO2015047306 A1 disclosed a method of first adsorbing titanium alkoxide precursors on the latex particles, followed by reacting with hydroperoxide to generate oxygen bubbles. The oxygen bubbles then sever as the template to synthesize porous and hollow titanium dioxide pigment particles. However, the methods disclosed by the above patents require tedious hydrolysis and crystallization of metal alkoxide precursors as well as removal of the core template. Desorption of the inorganic pigment from the hollow particles is also observed during purification stage.

Therefore, there is a need for overcoming the disadvantages and problems mentioned above. The present invention overcomes the problems associated with prior arts as mentioned above. Furthermore, the present invention disclosed herein provides additional features such as stress-induced damage detection.

SUMMARY OF THE INVENTION

The aforementioned problems are resolved by various aspects and embodiments disclosed herein. The invention provides herein a white inkjet ink composition comprising a binder, an ink solvent, one or more surfactants, one or more optional additives, and a colorant comprising one or more white hollow composite particles. Unlike the hollow composite particles produced by bottom up approach, whereby the inorganic nanoparticles are growth via crystallization of metal alkoxide precursors in the presence of polymer template followed by removal of the template materials, the hollow composite particles disclosed herein are made by a process involving one-step Pickering mini-emulsion polymerization, which allows direct using commercially obtained $TiO_2$ particles as a building block to stabilize both one or more monomers and one or more oil-soluble initiators in an aqueous solution in the presence of co-stabilizer. Through subsequent homogenization and mini-emulsion polymerization generates hollow composite spheres consisting of hollow core, and a crosslinked shell layer wherein crosslinked polymers strongly bind white colored inorganic particles using a surface anchoring agent, as shown in FIG. 1. The functions of the crosslinked shell layer of the hollow composite particles not only prevents inorganic particles from detachment upon mechanical stress, but also provides structural integrity for the hollow structure after drying, which confers the hollow composite particles suitable for inkjet ink application. More importantly, our one-step Pickering mini-emulsion polymerization approach does not require a stringent step to remove the core template. Furthermore, this approach allows encapsulation of oil soluble dyes into hollow composite particles, wherein the dye encapsulated hollow composite particles are able to detect intermittent cracking of the substrate upon external stress.

In one aspect, provided herein is a method of making hollow composite particles comprising the steps of:

a) forming a Pickering mini-emulsion by
   (i) mixing a mixture of one or more monomers, one or more crosslinkers, one or more oil-soluble initiators, and one or more hydrophobes to form an oil phase;
   (ii) dispersing inorganic particles in an aqueous solution comprising one or more surface anchoring agents to form an aqueous phase; and
   (iii) emulsifying the oil phase in the aqueous phase using a dispersing device to form a stable emulsion comprising a plurality of oil droplets wherein the inorganic particles act as a stabilizer by assembling at the oil-water interface of the oil droplets; and
b) polymerizing the one or more monomers, one or more surface anchoring agents, and one or more crosslinkers in the oil droplets to form the hollow composite particles.

In certain embodiment, each of the hollow composite particles comprises the inorganic particles; a crosslinked polymer shell; and a hollow core inside the crosslinked polymer shell, and wherein the inorganic particles adhere on the surface of the crosslinked polymer shell.

In some embodiments, the dispersing device is a high-power ultrasonication machine or a high pressure microfluidizer homogenizer.

In certain embodiments, the one or more surface anchoring agents prevent desorption of inorganic particles from the crosslinked polymer shell. In some embodiments, the one or more surface anchoring agents comprise a vinyl group and an acid group. In further embodiments, the one or more surface anchoring agents are selected from vinylacetic acid, acrylic acid, methacrylic acid, vinyltrimethoxysilane, vinyltriacetoxysilane, γ-methacryloxypropyltrimethoxysilane, 4-vinylbenzoic acid, and combinations thereof.

In some embodiments, the inorganic particles are bare inorganic particles, surface-modified inorganic particles, or a combination thereof. In further embodiments, the inorganic particles are titanium dioxide, surface-modified titanium dioxide or a combination thereof.

In another aspect, provided herein are hollow composite particles prepared by the methods disclosed herein. In certain embodiments, the average diameter of the hollow composite particles is from about 200 nm to about 1,000 nm. In some embodiments, the inorganic particles of the hollow composite particles are titanium dioxide, surface-modified titanium dioxide or a combination thereof.

In some embodiments, the mixture in step a)(i) further comprises one or more oil soluble dyes. In certain embodiments, the one or more oil soluble dyes are in the hollow core of the hollow composite particles disclosed herein.

In another aspect, provided herein is an inkjet ink composition comprising:

a. a colorant comprising the hollow composite particles disclosed herein or a combination of the hollow composite particles disclosed herein and traditional pigment particles;
b. an ink solvent;
c. a binder;
d. one or more surfactants; and
e. an additive.

In certain embodiments, the hollow composite particles comprise white inorganic particles adhering on the surface of the crosslinked polymer shell. In further embodiments, the white inorganic particles are titanium dioxide, surface-modified titanium dioxide or a combination thereof.

In some embodiments, the colorant comprises titanium dioxide hollow composite particles, zinc oxide hollow composite particles or a combination thereof. In other embodiments, the colorant comprises the hollow composite particles disclosed herein, or a combination of a white pigment and the hollow composite particles disclosed herein. In further embodiments, the colorant is present in an amount from about 0.1% to about 30% by weight, based on the total weight of the inkjet ink composition.

In certain embodiments, the average diameter of the hollow composite particles is from about 150 nm to about 1,000 nm or from about 200 nm to about 1,000 nm. In further embodiments, an average diameter of the hollow composite particles is greater than about 150 nm, greater than about 200 nm or greater than about 250 nm.

In some embodiments, the binder is a functional polymer. In other embodiments, the functional polymer functions as a stabilizer or a binder or a combination thereof. In further embodiments, the binder is present in an amount from about 0.1% to about 35% by weight, based on the total weight of the inkjet ink composition.

In certain embodiments, the ink solvent is selected from the group consisting of ketones, alcohols, esters, and combinations thereof. In some embodiments, the ink solvent comprises a mixture of methyl ethyl ketone, ethyl acetate and ethanol. In further embodiments, the ink solvent is present in an amount from about 50% to about 85% by weight, or from about 65% to about 80% by weight, based on the total weight of the inkjet ink composition.

In some embodiments, the one or more surfactants are present in an amount from about 0.1% to about 15% by weight, based on the total weight of the inkjet ink composition.

In certain embodiments, the additive is selected from the group consisting of plasticizers, surfactants, light stabilizers, defoaming agents, antioxidants, UV stabilizers, bactericides, conducting agents, rub resistance agents, and combinations thereof.

DETAILED DESCRIPTION OF THE INVENTION

General Definitions

Figure 1:
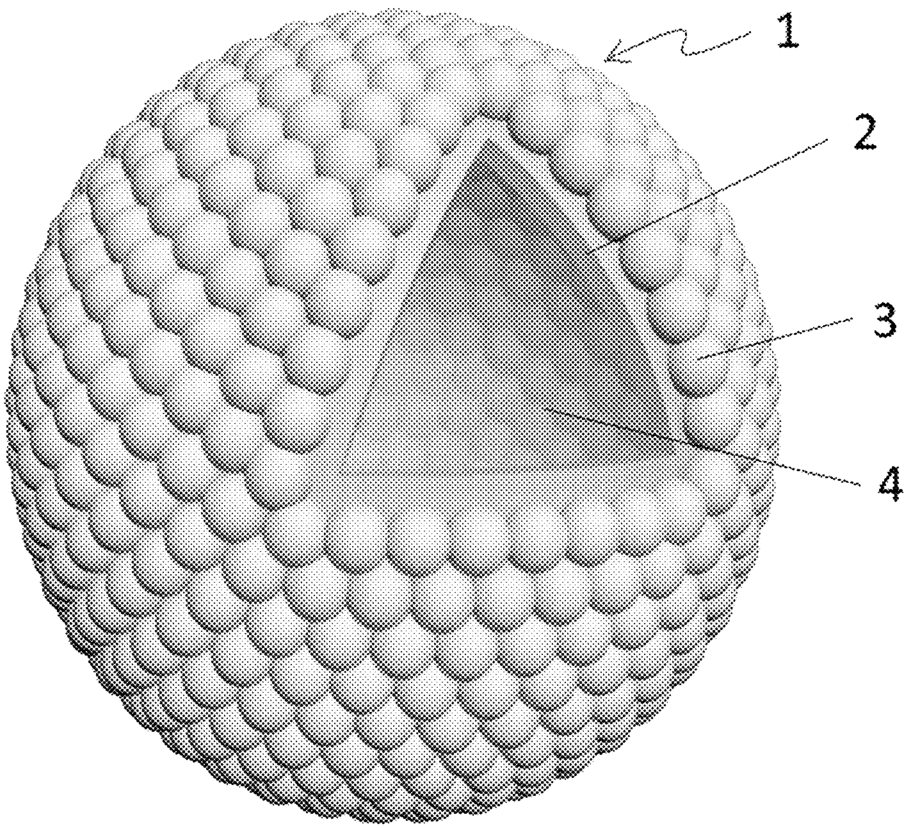
FIG. 1 depicts an embodiment of the hollow composite particle (1) disclosed herein comprising inorganic particles (3); a crosslinked polymer shell (2); and a hollow core (4) inside the crosslinked polymer shell (2).

The term "hollow composite particles" refers to particles having an average diameter ranging from about 100 nm to about 1,500 nm or from about 200 nm to about 1,000 nm, wherein each of the particles comprises a crosslinked polymer shell; a hollow core inside the crosslinked polymer shell; and inorganic particles adhered on the surface of the crosslinked polymer shell. The hollow composite particles may be spherical, ellipsoidal, or irregular in shape or the like. The presence of the cavity provides the hollow composite particle with unique characteristics, such as a lower density than its non-hollow counterparts, multiple light scattering and thermal insulation properties. The inorganic particles are on the surface of the crosslinked polymer shell or partially embedded in the polymer network of the crosslinked polymer shell. In certain embodiments, the inorganic particles adhere or bond to the surface of the crosslinked polymer shell with its polymer network functions as an adhesive. The crosslinked polymer shell not only provides the hiding power of the ink compositions, but also maintains the structural integrity of the hollow composite particle. Some non-limiting examples of the hollow composite particles include titanium dioxide hollow composite particles and zinc oxide hollow composite particles.

The term "inorganic particles" refers to particles that are in the form of a plurality of single nanoparticles or a nanoparticle cluster. The size of the nanoparticles or nanoparticle cluster is from about 0.1 nm to about 500 nm, from about 0.5 nm to about 500 nm, from about 1 nm to about 500 nm, from about 1 nm to about 400 nm, from about 1 nm to about 300 nm, or from about 1 nm to about 200 nm in size or diameter. Some non-limiting examples of the nanoparticles include particles of titanium dioxide and zinc oxide.

The term "surface-modified particles" in the ink composition disclosed herein refers to particles surface-treated or coated with a layer of an organic or inorganic modifier. The surface modifier not only enhances the dispersion stability of the particles, but also facilitates the formation of Pickering oil-in-water emulsion. Non-limiting examples of suitable inorganic modifier include alumina, silica, siloxane polymers and combinations thereof.

The term "titanium dioxide hollow composite particle" in the ink composition disclosed herein refers to a hollow composite particle comprising a hollow core and a crosslinked shell wherein crosslinked polymers strongly bind titanium dioxide particles or surface-modified titanium dioxide particles. Some non-limiting examples of titanium dioxide particles include anatase, rutile, brookite or a combination thereof.

The term "white pigment" disclosed herein refers to a pigment particle having a size ranging from 150 nm to 800 nm in diameter. Some non-limiting examples of the pigment particles include particles of titanium dioxide, zinc oxide and combinations thereof.

The term "polymer" disclosed herein refers to a polymeric compound prepared by polymerizing monomers or derived from 2 or more molecules of monomers, whether of the same or a different type. The generic term "polymer" embraces the terms "homopolymer," "copolymer," "terpolymer" as well as "interpolymer." In some embodiments, the polymer is derived from more than 1, 2, 3, 4, 5, 10, 15 or 20 molecules of one or more monomers and/or one or more co-monomers.

The term "functional polymer" disclosed herein refers to an organic polymer comprising at least one functional or polar group pendant from the polymer backbone that help improve physical performance including adhesion, rub resistance and transfer resistance of the inkjet ink composition disclosed herein. In some embodiments, the functional or polar group is quaternary ammonium, hydroxy, an acid group (e.g., salts or acids based on sulfate, salts or acids based on sulfonate, salts or acids based on phosphate, salts or acids based on phosphonate, salts or acids based on carboxyl), a basic group (e.g., amino group) or a combination thereof.

The term "surfactant" disclosed herein refers to a molecule or a polymer that lowers the surface tension between a liquid and a solid. The surfactant helps disperse and stabilize the hollow composite particles in the solvent used in an inkjet ink composition. In some embodiments, the surfactant possesses a functional or polar group containing quaternary ammonium, hydroxy, an acid group (e.g., salts or acids based on sulfate, salts or acids based on sulfonate, salts or acids based on phosphate, salts or acids based on phosphonate, salts or acids based on carboxyl), a basic group (e.g., amino group) or a combination thereof.

The term "co-stabilizer" disclosed herein refers to a compound that functions as a stabilizer to suppress the oil droplets collapsing together to form bigger droplets in an oil-in-water emulsion. In some embodiments, the co-stabilizer is derived from one or more C10-C20 hydrocarbons, one or more fatty alcohols with chain length from C10-C20, one or more polymers, or a combination thereof.

The term "crosslinker" disclosed herein refers to a monomer having two or more double bonds end group that are used for polymerization.

The term "surface anchoring agent" disclosed herein refers to a monomer having a double bond and specific functional group that provides a strong interaction or a linkage between the crosslinked polymer shell and the inorganic nanoparticles via chemical bonding or, physical adsorption, or a combination thereof.

The term "initiator" disclosed herein refers to a compound that produces radical species under mild conditions and promotes radical reactions. In some embodiments, the initiator is derived from one or more peroxide compounds, one or more azobis compounds, or a combination thereof.

The term "Pickering mini-emulsion" disclosed herein refers to a type of emulsion that is stabilized by solid particles which preferentially adsorb or assemble onto the interface between water and oil phase. The term "mini-emulsion" refers to an emulsion in which the droplets are of submicron-size, prepared by shearing a mixture comprising two immiscible liquid phases, one or more surfactants, one or more co-stabilizers (e.g., cetyl alcohol) with the help of a dispersing device, such as a high-pressure homogenizer, a high power ultrasound and combinations thereof. In some embodiment, oil droplets are stabilized by adsorbing either inorganic particles (e.g., $TiO_2$ particles) or surface-modified inorganic particles in oil-water interface.

The term "whiteness" refers to the lightness value L* of a dried ink sample measured using a Spectrocolorimeter (Lovibond LC 100) according to the CIE 1976 LAB standard observer (10°) under D65 illuminant condition, wherein the inkjet ink was applied at a fixed volume (0.1 mL) on a black tile with lightness value L*=10 (a*=0, b*=0) and then dried at 25° C. for 1 hour. A lightness value L*=100 indicates maximum lightness in the scale, and L*=0 indicates minimal lightness. In some embodiments, the hollow composite particles disclosed herein have a lightness value L* greater than about 90, greater than about 88, about 86, greater than about 84, greater than about 82 or greater than about 80.

The "hiding power" refers to the ability of a coating material to cover the surface substrate upon where it is applied. The hiding power of the coatings was determined based on standard procedures described in ASTM D2805-11 Standard Test Method for Hiding Power of Paints by Reflectometry using a Lovibond LC 100 Spectrocolorimeter. The hiding power ($m^2/L$) is the amount of coating material per unit area required to achieve a contrast ratio of 0.98 which is equivalent to the reflectance of a film that is thick enough to have the same reflectance over both a black and a white substrate. The contrast ratio is defined as the ratio of the reflectance of a film on a black substrate having a reflectance of 1% or less to the reflectance of an identical film on a white substrate having a reflectance of 80%.

A composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total weight of the composition.

In the following description, all numbers disclosed herein are approximate values, regardless of whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Method of Making the Hollow Composite Particles

Disclosed herein is a method of producing hollow composite particles wherein each of the hollow composite particles comprises inorganic particles; a crosslinked polymer shell; and a hollow core inside the crosslinked polymer shell, and wherein the inorganic particles adhere on the surface of the crosslinked polymer shell. In some embodiments, the inorganic particles are white colored inorganic particles.

The hollow composite particles may be made by a method which combines Pickering emulsification and mini-emulsion polymerization comprising the steps of a) forming a Pickering mini-emulsion by
   (i) mixing a mixture of one or more monomers, one or more crosslinkers, one or more oil-soluble initiators, and one or more hydrophobes to form an oil phase;
   (ii) dispersing inorganic particles in an aqueous solution comprising one or more surface anchoring agents to form an aqueous phase; and
   (iii) emulsifying the oil phase in the aqueous phase using a dispersing device to form a stable emulsion comprising a plurality of oil droplets wherein the inorganic particles act as a stabilizer by assembling at the oil-water interface of the oil droplets; and
b) polymerizing the one or more monomers, one or more surface anchoring agents, and one or more crosslinkers in the oil droplets to form the hollow composite particles.

In certain embodiments, the method disclosed herein further comprises a step of removing the one or more hydrophobes from the hollow composite particles. Any method that can remove a liquid from a solid can be used herein. In some embodiments, the one or more hydrophobes are removed by heat and/or under reduced pressure. In other embodiments, the one or more hydrophobes are removed by extraction with a low boiling solvent having a lower boiling point than the one or more hydrophobes. The low boiling solvent can be subsequently removed by heat and/or under reduced pressure. In further embodiments, the one or more hydrophobes are removed by extraction with a supercritical fluid, such as supercritical carbon dioxide, supercritical $N_2$—$NH_3$, supercritical $NH_3$—$CH_4$, supercritical $SO_2$—$N_2$, and supercritical n-butane-$H_2O$ systems. Some suitable fluorescent dyes are disclosed in a Wikipedia article, titled "Supercritical Fluid," downloadable from the website at https://en.wikipedia.org/wiki/Supercritical_fluid, which is incorporated herein by reference.

In some embodiments, the average diameter of the hollow composite particles is from about 150 nm to about 1,500 nm, from about 150 nm to about 1,000 nm, from about 200 nm to about 1,000 nm, from about 200 nm to about 900 nm, from about 200 nm to about 800 nm, or from about 200 nm to about 700 nm. In certain embodiments, the average diameter of the hollow composite particles is from 200 nm to 600 nm. In other embodiments, the average diameter of the hollow composite particles is less than about 1500 nm, less than about 1000 nm, less than about 900 nm, less than about 800 nm, less than about 700 nm, less than about 600 nm, less than about 500 nm, less than about 400 nm or less than about 300 nm. In further embodiments, the average diameter of the hollow composite particles is more than about 100 nm, more than about 150 nm, more than about 200 nm, more than about 250 nm or more than about 300 nm.

In some embodiments, the water to oil ratio is ranged from about 3:1 to about 30:1, from about 4:1 to about 20:1, from about 5:1 to about 15:1, from about 5:1 to about 10:1 or from about 10:1 to about 15:1.

In some embodiments, the refractive index of the inorganic particles used for making the hollow composite particles disclosed herein is greater than about 1.5, greater than about 1.6, greater than about 1.7, greater than about 1.8, greater than about 1.9, greater than about 2.0, greater than about 2.05, greater than about 2.1, greater than about 2.15 or greater than about 2.2. In certain embodiments, the refractive index of the inorganic particles is less than about 4.0, less than about 3.5, less than about 3.0, less than about 2.5, less than about 2.4, less than about 2.3, less than about 2.2, less than about 2.1, or less than about 2.0.

In certain embodiments, the inorganic particles are white inorganic pigments. In some embodiments, the white inorganic pigments are selected from titanium(IV) oxide (aka titanium dioxide or $TiO_2$), zinc oxide, antimony(III) oxide, barium sulfate, lithopone, and combinations thereof. In other embodiments, the white inorganic pigments are surface-treated by conventional surface treatment methods or by the surface treatment methods disclosed herein. In further embodiments, the inorganic pigments are selected from titanium(IV) oxide ($TiO_2$), zinc oxide, and combinations thereof.

In some embodiments, the inorganic particles are present in an amount from about 5% to about 90% by weight, from about 10% to about 90% by weight, from about 20% to about 90% by weight, from about 30% to about 90% by weight, from about 40% to about 90% by weight, from about 50% to about 90% by weight, from about 50% to about 85% by weight, from about 50% to about 80%, or from about 50% to about 75%, based on the total weight of the hollow composite particles.

In some embodiments, the average diameter of the inorganic particles is from about 1 nm to about 500 nm or from about 1 nm to about 150 nm. In certain embodiments, the average diameter of the inorganic particles is less than about 90 nm. In other embodiments, the average size or diameter of the particles is from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, from about 1 nm to about 10 nm, from about 3 nm to about 90 nm, from about 3 nm to about 80 nm, from about 3 nm to about 70 nm, from about 3 nm to about 60 nm, from about 3 nm to about 50 nm, from about 3 nm to about 40 nm, from about 3 nm to about 30 nm, from about 3 nm to about 20 nm, or from about 3 nm to about 10 nm. In further embodiments, the average diameter of the particles is less than about 90 nm, less than about 80 nm, less than about 70 nm, less than about 60 nm, less than about 50 nm, less than about 40 nm, less than about 30 nm, less than about 20 nm, or less than about 10 nm. In additional embodiments, the average diameter of the particles is less than about 50 nm or less than about 100 nm; and more than about 1 nm, more than about 5 nm, more than about 10 nm, more than about 15 nm, or more than about 20 nm.

In certain embodiments, the titanium dioxide particles are bare titanium dioxide particles, surface-modified or surface-treated titanium dioxide particle, or a combination thereof. In some embodiment, the coating or treatment occurs during the particle manufacturing stage to produce coated or treated particles. Some non-limiting examples of bare titanium dioxide particles include EVONIK AEROXIDE P25, Aladdin T104949, and Macklin T818936. Some non-limiting examples of surface-modified titanium dioxide particles include SUNJIN BEAUTY SCIENCE TX-85, TXD-40, and MERCK Eusolex T-AVO.

In some embodiments, the crystalline structure of titanium dioxide particles can be either anatase, rutile, brookite, or a combination thereof.

In certain embodiments, the bare inorganic nanoparticles or the surface-modified inorganic nanoparticles are coated or treated with a silane coupling agent, an aromatic phosphoric, phosphonic or sulfonic acid (e.g., phenylphosphonic acid) or a combination thereof. The coated or treated nanoparticles can be dispersed in a polymer in order to tune the surface tension of the inorganic nanoparticles.

In some embodiments, the silica coating disclosed here as a precursor to react with silane coupling agent to form siloxane polymer coating. Some non-limiting examples of suitable silanol precursor for the formation of silica coating include tetramethyl orthosilicate (TMOS), tetraethyl orthosilicate (TEOS), tetrapropyl orthosilicate (TPOS), tetrabutyl orthosilicate (TBOS), methyl polysilicate, ethyl polysilicate, etc.

In further embodiments, the method disclosed herein further comprises reacting silane coupling agent with silica coating to form siloxane polymer coating for enhancing the dispersing ability of the particles and also the adhesion strength on a particular substrate disclosed herein. Some non-limiting examples of suitable silane coupling agents obtained from Dow Corning include methyltrimethoxysilane, methyltriethoxysilane, dimethyldimethoxysilane, propyltrimethoxysilane, isobutyltrimethoxysilane, phenyltrimethoxysilane, n-octyltriethoxysilane, aminopropyltriethoxysilane, aminoethylaminopropyltrimethoxysilane, vinylbenzylated aminoethylaminopropyltrimethoxysilane, benzylated-aminoethylaminopropyltrimethoxysilane, γ-methacryloxypropyltrimethoxysilane, γ-glycidoxypropyltrimethoxysilane, γ-chloropropyltrimethoxysilane, γ-chloropropyltriethoxysilane, vinyltrimethoxysilane, vinyltriacetoxysilane, mercaptopropyltriethoxysilane, bis-(triethoxysilylpropyl)-disulfide, bis-(triethoxysilylpropyl)-tetrasulfide, γ-ureidopropyltriethoxysilane, and epoxy silane modified melamine resin.

In some embodiments, the one or more monomers are polymerized to form a polymer shell. Any monomer that can be polymerized with an initiator and/or heat to form a larger polymer chain or three-dimensional network can be used herein. Some non-limiting examples of suitable monomers are vinyl monomers including those of formula $R^1R^2C—CH_2$, wherein $R^1$ is hydrogen or alkyl, and where $R^2$ is alkyl, aryl, heteroaryl, halo, cyano, or other suitable hydrophobic group. In certain embodiments, $R^1$ is hydrogen or methyl. In other embodiments, $R^2$ is $C_1$-$C_6$ alkyl; phenyl; monocyclic heteroaryl having from 4 to 8 ring atoms, or having 5 or 6 ring atoms, and with 1, 2 or 3 ring heteroatoms, preferably 1 or 2, more preferably 1 ring atom, selected from nitrogen, oxygen, or sulfur; chloro; or cyano. Some non-limiting examples of suitable vinyl monomers include styrenic monomer (e.g., styrene, 2-methyl styrene, 4-methyl styrene); vinyl monomer (e.g., vinyl acetate, methyl vinyl ether, ethyl vinyl ether, butyl vinyl ether), etc. Examples of acrylate monomers include those of formula $CH_2{=}CR^3COOR^4$, where $R^3$ is hydrogen or alkyl, and where $R^4$ is alkyl or substituted allyl, or other suitable hydrophobic group. Groups for $R^3$ include hydrogen and methyl. Group for $R^4$ include $C_1$-$C_{16}$, for example $C_1$-$C_{12}$ alkyl which may be straight-chain or branched, and such groups substituted with one or more substituents chosen from unsubstituted amino, monosubstituted amino or disubstituted amino, hydroxy, carboxy, or other usual acrylate substituent. Acrylate monomers can comprise methacrylate type monomer (e.g., methyl methacrylate, butyl methacrylate, benzyl methacrylate, 2-n-Butoxyethyl methacrylate); acrylate type monomer (e.g., n-butyl acrylate, sec-butyl acrylate, tert-butyl acrylate, 2-hydroxyethyl acrylate, benzyl acrylate, n-hexyl acrylate, 2-ethylhexyl acrylate), etc. Examples of acrylamide monomers include those of formula $CH_2{=}CR^3COONHR^4$, where $R^3$ and $R^4$ as defined. Examples of N-substituted include those of formula $CH_2{=}CR^1CONR^2$, where $R^1$ is hydrogen or alkyl and $R^2$ is alkyl or substituted alkyl or another suitable hydrophobic group.

In some embodiments, one or more crosslinkers are used to crosslink and enhance mechanical strength of the polymer shell. Any crosslinker that can join two polymer chains together can be used herein. Some non-limiting examples of suitable vinyl crosslinkers include divinylbenzene, 1,4-divinylnaphthalene, 2-methoxy-1,4-divinylbenzene, 4-methoxy-1,2-divinylbenzene, 4-methoxy-1,3-divinylbenzene, 1,4-diisopropenylbenzene, 4-(α-methylethenyl)styrene, 4-(α-ethylethenyl)styrene, 4-(α-butylethenyl)styrene, 4-(α-isopropylethenyl)styrene, and 4-(α-tert-butylethenyl) styrene; acrylate type crosslinker include Ethylene glycol diacrylate, diethylene glycol diacrylate, 1,4-butanediol diacrylate, triethylene glycol diacrylate, 1,6-hexanediol diacrylate; ethylene glycol dimethacrylate, diethylene glycol dimethacrylate, 1,3-Butanediol dimethacrylate, triethylene glycol dimethacrylate, 1,6-hexanediol dimethacrylate, N,N'-methylenebisacrylamide, acrylic anhydride, trimethylolpropane triacrylate, trimethylolpropane trimethacrylate, etc.

In some embodiments, one or more surface anchoring agents are used to chelate the surface of inorganic particles so as to serve as a linker to bind crosslinked polymer shell to the surface of inorganic particles. Some non-limiting examples of suitable surface anchoring agent include vinylacetic acid, acrylic acid, methacrylic acid, vinyltrimethoxysilane, vinyltriacetoxysilane, γ-methacryloxypropyltrimethoxysilane, 4-vinylbenzoic acid, etc.

In some embodiments, one or more oil-soluble initiators are used to initiate the polymerization. Some non-limiting examples of suitable oil-soluble initiators include azo-type and peroxides-type initiators. Some non-limiting examples of suitable azo-type initiators include 2,2'-Azobis(2-methylpropionitrile), 2,2'-azobis-(2-cyclopropylpropionitrile), 2,2'-azobis-(2,4-dimethylvaleronitrile), 2,2'-azobis-(2,4-dimethyl-4-methoxyvaleronitrile), 2,2'-azobis-(1-cyclooctanenitrile), 1,1'-azobis-3-chlorocumene, 1,1'-azobis-4-chlorocumene, 2,2'-azobis-2-(4-tolyl)propane, 1,1'-azobis-1-(4-tolyl)cyclohexane, 2,2'-azobis-(isobutyronitrile), 2,2'-azobis-2,4,4-trimethylvaleronitrile, 2,2'-azobis-2-methylbutyronitrile, 2,2'-azobis-2-ethylpropionitrile, 1,1'-azobis-1-cyclopentanenitrile, 2,2'-azobis-2,3-dimethylbutyronitrile, 2,2'-azobis-2-methylvaleronitrile, 2,2'-azobis-2-cyclobutylpropionitrile, 1,1'-azobis-1-cyclohexanenitrile, 2,2'-azobis-2-propyl-butyronitrile, 2,2'-azobis-2,3,3-trimethylbutyronitrile, 2,2'-azobis-2-methylhexylonitrile, 2,2'-azobis-2-isopropylbutyronitrile, 1,1'-azobis-1-cycloheptanenitrile, 1,1'-azobis-1-(2-methylcyclohexane)-nitrile, 1,1'-azobis-1-cyclohexanecarbonitrile, 2,2'-azobis-2-isopropyl-3-methylbutyronitrile, 2,2'-azobis-2-benzylpropionitrile, 2,2'-azobis-2-(4-chlorobenzyl) propionitrile, 2,2'-azobis-2-(4-nitrobenzyl)propionitrile, 1,1'-azobis-1-cyclodecanenitrile azobis-isobutyramidine, 2,2'-azobis-methyl-2-methylpropionate azobis-(1-carbomethoxy-3-methylpropane), 2,2'-azobis-(ethyl-2-methylpropionate), 1,1'-azobis-1-chloro-1-phenylethane, 1,1'-azobis-1-chloro-1-(4-bromophenyl)ethane, 3,7'-diphenyl-1,2-diaza-1-cycloheptene, 1,1'-azobis-cumene, 2-(t-butylazo)-4-methoxy-2,4-dimethylpentanenitrile, 2-(t-butylazo)-2,4-dimethylpentanenitrile, 2-(t-butylazo)isobutyronitrile, 2-(t-butylazo)-2-methylbutanenitrile and 1-(t-amylazo) cyclohexanecarbonitrile. Such azo-type initiators, for example, are commercially obtained under the tradenames WAKO (Japan). Some non-limiting examples of suitable peroxide-type initiators include acetyl benzoyl peroxide, cyclohexanone peroxide, cyclohexyl hydroperoxide, cumene hydroperoxide, t-butyl hydroperoxide 2,4-dichlorobenzoyl peroxide, hydroxyl heptyl peroxide, isopropyl percarbonate, methyl ethyl ketone peroxide, peracetic acid, acetyl peroxide, methyl amyl ketone peroxide, methyl cyclohexyl hydroperoxide, diisobutyryl peroxide, t-butyl peracetate, t-butylperphthalic acid, p-chlorobenzoyl peroxide, dibenzal peroxide, and di-t-butyl peroxide. Such peroxide-type initiators, for example, are commercially obtained under the tradenames Tokyo Chemicals Industry Co., Ltd. (Japan). In a preferred embodiment, 2,2'-Azobis(2,4-dimethylvaleronitrile), 2,2'-azobis (isobutyronitrile), 4,4'-azobis (4-cyanopentanoic acid), 2,2'-azobis-(2,4-dimethylvaleronitrile), t-butyl hydroperoxide, cumene hydroperoxide, benzoyl peroxide and lauroyl peroxide. In addition, oil soluble redox couples may also be used. Suitable such couples utilize oxidants such as benzoyl peroxide, lauroyl peroxide, cumene hydroperoxide and the like together with reductants such as ferrous ions, iron pyrophosphate-sorbose, dimethylaniline, thiourea, triethylborane, sodium sulfide, hydrazine, sodium formaldehyde sulfoxylate, amines and the like. In addition, dimethylaniline may be used with such as Ni(II) chloride, cupric nitrate, benzoyl peroxide, or benzoyl chloride. Similarly, dimethyl aniline-N-oxide may be utilized with benzoic anhydride, cobaltous salts, or tetracyanoquino-dimethane.

In some embodiments, one or more co-stabilizers are used to prevent the oil droplets from collapsing together to form bigger droplets in an oil-in-water emulsion. Some non-limiting examples of suitable co-stabilizer include fatty alcohols with a carbon chain length from $C_{10}$ to $C_{30}$, fatty acids with a carbon chain length from $C_{10}$ to $C_{30}$, alkylamines with a carbon chain length from $C_{10}$ to $C_{30}$, polymers such as the functional polymers disclosed herein, and combinations thereof. In some embodiments, the one or more co-stabilizers are selected from fatty alcohols with a carbon chain length of $C_{12}$-$C_{14}$ or $C_{12}$-$C_{18}$, and combinations thereof.

In certain embodiments, the mixture in step a)(i) of the method disclosed herein further comprises a hydrophobe or a hydrophobic compound. Any hydrophobe that is immiscible with water can be used for the method disclosed herein. Some hydrophobes are disclosed in a Wikipedia article, titled "Hydrophobe," downloadable from the website at https://en.wikipedia.org/wiki/Hydrophobe, which is incorporated herein by reference.

Some non-limiting examples of suitable hydrophobe include alkanes, halogenated alkanes such as fluoroalkanes, cycloalkanes, arylalkanes, plant oils or vegetable oils, mineral oils, synthetic oils, and combinations thereof. In some embodiments, the hydrophobe is selected from $C_6$-$C_{30}$ alkanes, $C_6$-$C_{12}$ cycloalkanes, $C_6$-$C_{10}$ aryl-$C_8$-$C_{30}$ alkanes, vegetable oils and combinations thereof. In certain embodiments, the hydrophobe is a $C_8$-$C_{30}$ alkane, or $C_8$-$C_{25}$ alkane, $C_8$-$C_{20}$ alkane, $C_{10}$-$C_{25}$ alkane, $C_{10}$-$C_{20}$ alkane, or $C_{12}$-$C_{18}$ alkane. In other embodiments, the hydrophobe is selected from hexane, heptane, octane, nonane, decane, undecane, dodecane, tridecane, tetradecane, pentadecane, hexadecane, heptadecane, octadecane, nonadecane, icosane, cyclohexane, cycloheptane, cyclooctane, cyclononane, cyclodecane, structure isomers thereof, and combinations thereof. Some suitable vegetable oils are disclosed in a Wikipedia article, titled "Vegetable oil," downloadable from the website at https://en.wikipedia.org/wiki/Vegetable_oil, which is incorporated herein by reference. In some embodiments, the vegetable oil is a saturated or hydrogenated vegetable oil.

In some embodiments, the oil phase in the method disclosed herein further comprises one or more oil soluble dyes. Any oil soluble dye that is soluble in the oil phase can be used herein. Some non-limiting examples of oil soluble dye include solvent red, solvent orange, solvent yellow, solvent blue, solvent violet, solvent brown and solvent black dyes, commercially available from Hangzhou Epsilon Chemical Company, Ltd., Hangzhou, China; or Rushvi Finechem Pvt Ltd, Gujarat, India, or other commercial sources of oil soluble dye.

In some embodiments, the oil soluble dye is an oil soluble fluorescent dye. Any oil soluble fluorescent dye that is soluble in the oil phase and can re-emit light upon light excitation can be used herein. Some non-limiting examples of oil soluble fluorescent dye include fluorescein, Rhodamine 101, Rhodamine 6G, Pyrromethene 567, Pyrromethene 597, pyrromethene 650, DCM, Bestoil Green FYG, and combinations thereof. Some suitable fluorescent dyes are disclosed in a Wikipedia article, titled "Fluorophore," downloadable from the website at https://en.wikipedia.org/wiki/Fluorophore, which is incorporated herein by reference.

The use of the oil soluble dye in the oil phase enables the oil soluble dye remaining in the hollow core inside the crosslinked polymer shell after the polymerization step. Therefore, when a mark printed on a substrate with the inkjet ink composition disclosed herein is cracked or damaged by any external stress, the oil soluble dye will leak out. A color stain can be observed under visible light or UV light. As a result, inkjet ink compositions disclosed herein are capable of detecting cracking or damage once a substrate is under an external stress (e.g., high temperature, pressure, rubbing, scratching, etc.) or an internal stress.

Inkjet Ink Composition Comprising Hollow Composite Particles

Provided herein is an inkjet ink composition comprising a binder, an ink solvent, one or more optional additives, and a colorant comprising the hollow composite particles disclosed herein. Compared with a traditional white pigment, the hollow composite particles disclosed herein are more readily dispersed in an organic solvent with the aid of one or more surfactants and can provide a print with a higher degree of whiteness. Further, the inkjet ink composition disclosed herein has an excellent printing stability without clogging of nozzle plate during inkjet printing.

In one aspect, provided herein is an inkjet ink composition comprising:

a) a colorant comprising the hollow composite particles disclosed herein or a combination of the hollow composite particles disclosed herein and traditional pigment particles;

b) an ink solvent;

c) a binder;

d) one or more surfactants; and e) one or more optional additive.

In some embodiments, the colorant comprises the white hollow composite particles disclosed herein or a combination of the white hollow composite particles disclosed herein and traditional white pigment particles.

In certain embodiments, the colorant is present in an amount from about 1% to about 30% by weight, based on the total weight of the inkjet ink composition.

In some embodiments, the ink solvent is selected from the group consisting of ketones, alcohols, esters, and combinations thereof. In certain embodiments, the ink solvent comprises a mixture of methyl ethyl ketone, ethyl acetate and ethanol. In other embodiments, the ink solvent is present in an amount from about 40% to about 70% by weight, or from about 60% to about 70% by weight, based on the total weight of the inkjet ink composition.

In some embodiments, the functional polymer functions as a stabilizer or a binder or a combination thereof.

In certain embodiments, the binder resin is present in an amount from about 0.1% to about 35% by weight, based on the total weight of the inkjet ink composition.

In some embodiments, the functional polymer functions as a stabilizer or a binder or a combination thereof. The functional polymer has at least one functional or polar group pendant from the polymer backbone that helps stabilize and/or disperse the particles disclosed herein in a solvent. Some non-limiting examples of the functional or polar groups include quaternary ammonium, amino, hydroxyl, heterocyclic moieties, sulfuric acid and sulfate groups, sulfonic acid and sulfonate salts groups, phosphoric acid and phosphate groups, phosphonic and phosphonate groups, carboxylic acid and carboxylate groups, mixtures thereof, and the like. In certain embodiments, the polymer backbone of the functional polymer comprises a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), acrylic polymers (e.g., methyl methacrylate-co-butyl methacrylate copolymers, polymethyl methacrylate, etc.), or a combination thereof.

In certain embodiments, the surfactant is present in an amount from about 0.1% to about 30% by weight, based on the total weight of the inkjet ink composition.

In some embodiments, the additive is selected from the group consisting of plasticizers, surfactants, light stabilizers, defoaming agents, antioxidants, UV stabilizers, bactericides, conducting agents, rub resistant agents, and combinations thereof. In other embodiments, the additive comprises one or more plasticizers for solubilizing the binder.

In certain embodiments, the hollow composite particle or white pigment or a combination thereof is present in an amount from about 1% to about 30% by weight, based on the total weight of the inkjet ink composition. In some embodiments, the colorant is present in an amount from about 1 wt.

% to about 30 wt. %, from about 2 wt. % to about 30 wt. %, from about 3 wt. % to about 30 wt. %, from about 1 wt. % to about 25 wt. %, from about 1 wt. % to about 20 wt. %, from about 1 wt. % to about 15 wt. %, or from about 1 wt. % to about 10 wt. %, based on the total weight of the inkjet ink composition. In other embodiments, the colorant is present in an amount less than 30 wt. %, less than 25 wt. %, less than 20 wt. %, less than 15 wt. %, or less than 10 wt. %, based on the total weight of the inkjet ink composition. In further embodiments, the colorant is present in an amount more than 1 wt. %, more than 5 wt. %, more than 10 wt. %, more than 15 wt. %, or more than 20 wt. %, based on the total weight of the inkjet ink composition.

Any organic solvent or a solvent mixture that can dissolve the binder disclosed herein can be used as the ink solvent. The solvent is also a major component which acts as a vehicle for the colorant and provides ink with rapid drying properties. In some embodiments, the ink solvent disclosed herein comprises one or more solvents. The term "major component" refers to the component that is more than 50%, more than 55%, more than 60%, more than 65%, more than 70%, more than 75%, more than 80% by weight or volume, based on the total weight or volume of the ink solvent.

Some non-limiting examples of the organic solvent include lower alkanols containing 1 to 4 carbon atoms, such as methanol, ethanol, propanol, 2-propanol, butanol etc.; lower aliphatic ketones, such as acetone, dimethyl ketone, methyl ethyl ketone, methyl n-propyl ketone, methyl isobutylketone, cyclopropyl methyl ketone, etc.; other solvents such as ethyl acetate, isopropyl acetate, propyl acetate, butyl acetate; and combinations thereof. In certain embodiments, the solvent component is methyl ethyl ketone, ethyl acetate, ethanol or a combination thereof.

Other non-limiting examples of the solvent include ketone solvents, acetate solvents, the propionate esters, and carbonate solvents. Some non-limiting examples of the ketone solvents include methyl isoamyl ketone, methyl n-amyl ketone, diisobutylketone, diacetone alcohol, C-11 ketone, acetophenone, cyclohexanone and the like. Some non-limiting examples of the acetate solvents include dimethyl acetate, butyl acetate, isobutyl isobutyrate, n-butyl propionate, 2-ethylhexyl acetate, and the like. Some non-limiting examples of the glycol ethers such as propylene glycol monomethyl ether, ethylene glycol monomethyl ether, propylene glycol monotertiary butyl ether, ethylene glycol monopropyl ether, propylene glycol monopropyl ether, propylene glycol monobutyl ether, ethylene glycol monobutyl ether, diethylene glycol monomethyl ether, dipropylene glycol monomethyl ether, diethylene glycol monoethyl ether, diethylene glycol monopropyl ether, diethylene glycol monobutyl ether, and the like. Some non-limiting examples of the glycol ether acetate such as ethylene glycol monoethyl ether acetate, ethylene glycol monobutyl ether acetate, ethylene glycol diacetate, diethylene glycol monoethyl ether acetate, diethylene glycol monobutyl ether acetate, diethylene glycol monoethyl ether acetate, diethylene glycol monobutyl ether acetate, propylene glycol monomethyl ether acetate, and the like. Some non-limiting examples of the carbonate solvents comprise dimethyl carbonate, diethyl carbonate, ethylene carbonate, propylene carbonate, and the like. Some non-limiting examples of other solvent include N-methyl pyrrolidone, N-ethyl pyrrolidone, quinoline, pyridine, dimethyl formamide, m-cresol, 2-chlorophenol, and the like. The composition of the ink solvent further allows tuning the drying rate of the ink and adjusting the solution viscosity to any desired range, such as 2 to 10 mPa·s, for inkjet printers.

In certain embodiments, the ink solvent is selected from the group consisting of ketones, alcohols, esters, and combinations thereof. In certain embodiments, the ink solvent comprises a mixture of methyl ethyl ketone, ethyl acetate and ethanol. In certain embodiments, the ink solvent is substantially free of water. In other embodiments, the ink solvent contains less than 0.1 wt. %, less than 0.5 wt. %, less than 1 wt. %, less than 2 wt. %, less than 3 wt. %, or less than 5 wt. % of water, based on the total weight of the ink solvent.

In some embodiments, the ink solvent is present in an amount from about 50% to about 85% by weight, or from about 65% to about 80% by weight, based on the total weight of the inkjet ink composition. In other embodiments, the ink solvent is present in an amount less than 90 wt. %, less than 85 wt. %, less than 80 wt. %, less than 75 wt. %, or less than 70 wt. %, based on the total weight of the inkjet ink composition. In further embodiments, the ink solvent is present in an amount more than 40 wt. %, more than 45 wt. %, more than 50 wt. %, more than 60 wt. %, or more than 65 wt. %, based on the total weight of the inkjet ink composition.

The binder disclosed herein can be used to promote ink adhesion on substrates. Some non-limiting examples of the binders include aldehyde-ketone resins, epoxy resins, rosin esters, phenolic modified rosin resin, fumaric modified rosin resin, maleic modified rosin resin, hydrogenated rosin resin, dimerized rosin resin, silicon resins, alkyl benzene-sulfonamide resins, vinyl resins, cellulose derivatives, styrene-acrylic resins, styrene-maleic anhydride copolymers, acrylic resins, polyurethanes, polyurethane derivatives, polyester resins, polyamides, polysiloxane resins, poly(vinyl butyral) resins, aldehyde resins, phenolic resins, etc. In certain embodiments, a combination of two or more binders is used in order to provide better balance between the adhesion ability and ink viscosity.

In certain embodiments, the binder disclosed herein is a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), acrylic polymers (e.g., methyl methacrylate-co-butyl methacrylate copolymers, methyl methacrylate homopolymer, etc.) or a combination thereof. In some embodiments, the binder is a self-wetting binder comprising one or more polar group for interacting with the surface of the surface-modified particles. Some non-limiting examples of suitable polar groups include quaternary ammonium, amino, hydroxyl, heterocyclic moieties, sulfuric acid and sulfate groups, sulfonic acid and sulfonate salts groups, phosphoric acid and phosphate groups, phosphonic and phosphonate groups, carboxylic acid and carboxylate groups, mixtures thereof, and the like. Some self-wetting binders are disclosed in U.S. Pat. Nos. 6,139,946 and 6,139,966, both of which are incorporated herein by reference.

In some embodiments, the amount of the binders is from 0.1% to 50%, from 0.1% to 40%, from 0.1% to 35%, from 0.5% to 30%, or from 1% to 25% by weight. In certain embodiments, the binder is present in an amount from about 0.1% to about 35% by weight, based on the total weight of the inkjet ink composition. In other embodiments, the binder is present in an amount less than 35 wt. %, less than 30 wt. %, less than 25 wt. %, less than 20 wt. %, or less than 15 wt. %, based on the total weight of the inkjet ink composition. In further embodiments, the binder is present in an amount more than 0.1 wt. %, more than 1 wt. %, more than 3 wt. %, more than 5 wt. %, or more than 10 wt. %, based on the total weight of the inkjet ink composition.

The surfactants disclosed herein can be used to disperse the hollow composite particles in an ink composition. Some non-limiting examples of the surfactants under the following trade names include XIRAN® 1440, XIRAN® 17352, XIRAN® 2625, XIRAN® 1000, XIRAN® 2000, XIRAN® 3000, XIRAN® 4000, XIRAN® EF30, XIRAN® EF40, XIRAN® EF60, XIRAN® EF80, CrayValley SMA resins, Tego Disperse 625, Tego Disperse 650, Tego Disperse 652, Tego Disperse 655, Tego Disperse 656, Tego Disperse 670, Tego Disperse 671, Tego Disperse 672, Tego Disperse 679, Tego Disperse 685, Tego Disperse 688, Tego Disperse 710, Disper BYK 102, Disper BYK 103, Disper BYK 106, Disper BYK 108, Disper BYK 109, Disper BYK 110, Disper BYK 111, Disper BYK 115, Disper BYK 118, Disper BYK 140, Disper BYK 142, Disper BYK 163, Disper BYK 168, Disper BYK 180, Solsperse 32000, Solsperse 32500, Solsperse 36000, Solsperse 41000, Solsperse 75500, Solsperse 76500, Solsperse 83500, Solsperse 84500.

In some embodiments, the amount of the surfactants is from 0.1% to 30%, from 0.1% to 25%, from 0.1% to 20%, from 0.5% to 15%, or from 2% to 10% by weight. In certain embodiments, the surfactant is present in an amount from about 0.1% to about 15% by weight, based on the total weight of the inkjet ink composition. In other embodiments, the surfactants is present in an amount less than 20 wt. %, less than 15 wt. %, less than 10 wt. %, less than 5 wt. % based on the total weight of the inkjet ink composition. In further embodiments, the surfactant is present in an amount more than 0.1 wt. %, more than 1 wt. %, more than 3 wt. %, more than 5 wt. %, or more than 10 wt. %, based on the total weight of the inkjet ink composition.

Optionally, the inkjet ink composition disclosed herein comprises at least one additive for the purposes of improving and/or controlling the processability, appearance, physical, chemical, and/or mechanical properties of the inkjet ink composition. In some embodiments, the inkjet ink composition does not comprise an additive. Any inkjet ink additive known to a person of ordinary skill in the art may be used in the inkjet ink composition disclosed herein.

In some embodiments, the additive is selected from the group consisting of plasticizers, surfactants or surface modifiers, light stabilizers, defoaming agents, antioxidants, UV stabilizers, bactericides, conducting agents, rub resistant agents, and combinations thereof. In other embodiments, the additive comprises one or more plasticizers for solubilizing the binder. In further embodiments, the inkjet ink composition disclosed herein is substantially free of one or more of plasticizers, surfactants or surface modifiers, light stabilizers, defoaming agents, antioxidants, UV stabilizers, bactericides, conducting agents, and rub resistance agents.

In some embodiments, the total amount of the additives is from 0.1% to 10%, from 0.1% to 8%, from 0.1% to 6%, from 0.1% to 5%, from 0.1% to 4%, from 0.1% to 3%, from 0.1% to 2%, or from 0.1% to 1% by weight, based on the total weight of the inkjet ink composition. In certain embodiments, the total amount of the additive is from about 1 wt. % to about 10 wt. %, from about 2 wt. % to about 10 wt. %, from about 3 wt. % to about 10 wt. %, from about 0.1 wt. % to about 8 wt. %, from about 0.1 wt. % to about 6 wt. %, from about 0.1 wt. % to about 5 wt. %, or from about 0.1 wt. % to about 4 wt. %, based on the total weight of the inkjet ink composition. In other embodiments, the total amount of the additive is less than 10 wt. %, less than 8 wt. %, less than 6 wt. %, less than 5 wt. %, or less than 4 wt. %, based on the total weight of the inkjet ink composition. In further embodiments, the total amount of the additive is more than 0.1 wt. %, more than 0.5 wt. %, more than 1 wt. %, more than 2 wt. %, or more than 3 wt. %, based on the total weight of the inkjet ink composition.

The inkjet ink composition disclosed herein can comprise a plasticizer. Any plasticizer known to a person of ordinary skill in the art may be added to the inkjet ink composition disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polyester phthalate, polyester adipate, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioesters, aromatic sulfonamides and combinations thereof. Where used, the amount of the plasticizer in the inkjet ink composition can be from than 0 to about 10 wt. %, from about 0.5 wt. % to about 10 wt. %, or from about 1 wt. % to about 5 wt. % of the total weight of the inkjet ink composition. Some plasticizers have been described in George Wypych, "Handbook of Plasticizers," ChemTec Publishing, Toronto-Scarborough, Ontario (2004), which is incorporated herein by reference. In further embodiments, the inkjet ink composition disclosed herein is substantially free of plasticizer.

In some embodiments, the plasticizers include diethyl phthalate, di-n-butyl phthalate, diisobutyl phthalate, di-n-hexyl phthalate, bis(2-ethylhexyl) phthalate, diisodecyl phthalate, diisononyl phthalate, 1,2-cyclohexane dicarboxylic acid diisonoyl ester, tri-(2-ethyl hexyl)trimellitate, tri-(n-octyl, n-decyl)trimellitate, tri-(heptyl, nonyl)trimellitate, n-octyl trimellitate, bis(2-ethylhexyl)adipate, etc. In other embodiments, the total amount of the binders and the plasticizers is from 0.1% to 50%, from 0.1% to 40%, from 0.1% to 35%, from 0.5% to 30%, from 1% to 25%, from 2% to 20%, or from 3% to 15% by weight, based on the total weight of the inkjet ink composition.

The inkjet ink composition disclosed herein optionally comprises an antioxidant that can prevent the oxidation of polymer components and organic additives in the inkjet ink composition. Any antioxidant known to a person of ordinary skill in the art may be added to the inkjet ink composition disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially obtained from Ciba Geigy); phosphites and phosphonites; hydroxylamines; benzofuranone derivatives; and combinations thereof. Where used, the amount of the antioxidant in the inkjet ink composition can be from about greater than 0 to about 5 wt. %, from about 0.0001 to about 2.5 wt. %, from about 0.001 wt. % to about 1 wt. %, or from about 0.001 wt. % to about 0.5 wt. % of the total weight of the graft copolymer composition. Some antioxidants have been described in Zweifel Hans et al., "Plastics Additives Handbook," Hanser Gardner Publications, Cincinnati, Ohio, 5th edition, Chapter 1, pages 1-140 (2001), which is incorporated herein by reference. In further embodiments, the inkjet ink composition disclosed herein is substantially free of antioxidant.

The inkjet ink composition disclosed herein optionally comprises an UV stabilizer that may prevent or reduce the degradation of the inkjet ink composition by UV radiations. Any UV stabilizer known to a person of ordinary skill in the art may be added to the inkjet ink composition disclosed herein. Non-limiting examples of suitable UV stabilizers include benzophenones, benzotriazoles, aryl esters, oxanilides, acrylic esters, formamidines, carbon black, hindered amines, nickel quenchers, phenolic antioxidants, metallic salts, zinc compounds and combinations thereof. Where used, the amount of the UV stabilizer in the inkjet ink composition can be from 0 to about 5 wt. %, from about 0.01 wt. % to about 3 wt. %, from about 0.1 wt. % to about 2 wt. %, or from about 0.1 wt. % to about 1 wt. % of the total weight of the inkjet ink composition. Some UV stabilizers have been described in Zweifel Hans et al., "Plastics Additives Handbook," Hanser Gardner Publications, Cincinnati, Ohio, 5th edition, Chapter 2, pages 141-426 (2001), which is incorporated herein by reference. In further embodiments, the inkjet ink composition disclosed herein is substantially free of UV stabilizer.

The inkjet ink composition disclosed herein optionally comprises a surfactant. The surface modifiers or surfactants can be used to regulate the surface tension of inkjet ink composition disclosed herein and/or disperse the surfaced-modified particles in the ink solvent disclosed herein be used herein. Some non-limiting examples of suitable surfactants include anionic surfactants, cationic surfactants, non-ionic surfactants, zwitterionic surfactants, and combinations thereof. In some embodiments, one or more anionic surfactants, one or more non-ionic surfactants or a combination thereof are used. In further embodiments, the inkjet ink composition disclosed herein is substantially free of one or more of anionic surfactants, cationic surfactants, non-ionic surfactants, and zwitterionic surfactants.

Some non-limiting examples of the suitable surfactants include fluorosurfactants, siloxane-based surfactants, acetylenic diol-based surfactants, hydrocarbon-based surfactants, and combinations thereof. In some embodiments, two or more surfactants are used together in order to optimize the jetting stability.

In some embodiments, the surfactant is a phosphorylated polyoxyalkyl polyol ("POCA"). The POCA surfactant is fully described in U.S. Pat. No. 4,889,895. In some embodiments, the surfactant is one of the Emcol surfactants such as Emcol Chloride, Emcol Phosphate, and Emcol Acetate, all of which are available from Witco Chemical, Oakland, New Jersey. The Emcol surfactants are polypropoxylated quaternary ammonium based cationic surfactants.

In some embodiments, the anionic surfactant is or comprises an alkyl sulfate, an alkyl sulfonate, an alkylaryl sulfate, an alkylaryl sulfonate (e.g., alkyl-naphthalene sulfonates and alkylbenzene sulfonates) or a combination thereof.

In certain embodiments, the non-ionic surfactant is or comprises an alkyl polyoxyalkylene, an aryl polyoxyalkylene, a polyoxyalkylene block copolymers, a polyethylene oxide, a polypropylene oxide, a block copolymer of ethylene oxide and propylene oxide or a combination thereof. In other embodiments, the non-ionic surfactant is or comprises a polyether polyol, a polyoxyethylene $C_{8-20}$-alkyl ether, a polyoxyethylene $C_{8-20}$-alkylaryl ether (e.g., polyoxyethylene $C_{8-20}$-alkylphenyl ether), a polyoxyethylene $C_{8-20}$-alkyl amine, a polyoxyethylene $C_{8-20}$-alkenyl ether, a polyoxyethylene $C_{8-20}$-alkenyl amine, a polyethylene glycol alkyl ether or a combination thereof. Some non-limiting examples of suitable polyoxyethylene $C_{8-20}$-alkyl ethers include polyoxyethylene lauryl ether, polyoxyethylene cetyl ether, polyoxyethylene stearyl ether, polyoxyethylene branched decyl ether, polyoxyethylene tridecyl ether or a combination thereof. Some non-limiting examples of suitable polyoxyethylene $C_{8-20}$-alkylaryl ethers include polyoxyethylene dodecylphenyl ether, polyoxyethylene nonylphenyl ether, polyoxyethylene octylphenyl ether or a combination thereof. One non-limiting example of suitable polyoxyethylene $C_{8-20}$-alkenyl ether is polyoxyethylene oleic ether. Some non-limiting examples of suitable polyoxyethylene $C_{8-20}$-alkyl amines include polyoxyethylene lauryl amine, polyoxyethylene stearyl amine, polyoxyethylene tallow amine or a combination thereof. One non-limiting example of suitable polyoxyethylene $C_{8-20}$-alkenyl amine is polyoxyethylene oleyl amine. In other embodiments, the non-ionic surfactant is a polyether polyol, polyoxyethylene nonylphenyl ether, polyoxyethylene dodecylphenyl ether or a combination thereof. In certain embodiments, the non-ionic surfactant contains a polyoxyethylene hydrophilic tail.

The inkjet ink composition disclosed herein optionally comprises a conducting agent or an antistatic agent. The conducting agent or antistatic agent can be used to increase the conductivity of the inkjet ink composition and to prevent static charge accumulation. Non-limiting examples of suitable conducting agents or antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt. %, from about 0.01 to about 3 wt. %, or from about 0.1 to about 2 wt. % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), which is incorporated herein by reference. In further embodiments, the inkjet ink composition disclosed herein is substantially free of conducting or antistatic agent.

In some embodiments, the conducting or antistatic agent is selected from the salts of alkali metals, alkaline earth metals and quaternary ammonium. The counter ions of the salts can be selected from halides (e.g., chlorides, bromides, iodides, and fluorides), perchlorates, nitrates, thiocyanates, formates, acetates, sulfates, propionates, hexafluorophosphates, hexafluoroantimonates and combinations thereof. Some non-limiting examples of the conducting salt can also be ionic liquids such as 1-butyl-3-methylimidazolium tetrafluoroborate, and 1-butyl-3-methylimidazolium hexafluorophosphate.

In certain embodiments, provided herein is a method of making the hollow composite particles comprising the steps of:

a) preparing a water phase by treating the inorganic particles such as $TiO_2$ with surface anchoring agent by ultrasonication for 5 minutes, wherein the amount of the particles is present at 5%, or 10%, or 15% by weight;
b) preparing an oil phase by mixing a monomer (e.g., styrene), a crosslinker (e.g., divinyl benzene), an oil or a hydrophobe (e.g., hexadecane), and an initiator (e.g., V65), wherein the volume ratio of the monomer to the crosslinker is from about 1:1 to about 20:1, or from about 2:1 to about10:1, or from about 5:1 to about 20:1, wherein the volume ratio of a mixture of the monomer and the crosslinker to the oil or hydrophobe is about 1:1, or about 1:2, or about 2:1, wherein the molar ratio of a mixture of the monomer and the crosslinker to the initiator is from about 10:1 to about 100:1, or from about 20:1 to about 100:1, or from about 5:1 to about 100:1;

c) preparing an Pickering mini-emulsion by first mixing the oil phase with the water phase in about 5:1, or about 10:1, or about 15:1 by volume ratio, followed by homogenizing the mixture at a speed ranging from about 15,000 rpm to about 20,000 rpm, or about 21,000 rpm to about 25,000 rpm, and further undergoing a high-energy homogenization process (e.g., NOOZLE® high-pressure microjet homogenizer); and d) initiating the polymerization of the Pickering mini-emulsion in a 3 necked glass reactor under nitrogen atmosphere at a temperature ranging from about 50° C. to about 60° C., from about 60° C. to about 70° C., or from about 70° C. to about 80° C., wherein the reaction time is ranged from about 12 to about 24 hours, from about 25 to about 48 hours, or from about 49 to about 72 hours; or at about 55° C. for about 12 hours.

The inkjet ink composition disclosed herein is tested using a continuous inkjet printer, such as Leibinger Jet 2 & Jet3 series.

In certain embodiments, the inkjet ink composition disclosed herein comprises:

i) one or more colorants in an amount varying from about 0.01% to 30%, from about 0.05% to about 20%, from about 0.1% to about 10%, or from about 0.05% to about 5% by weight;

ii) one or more ink solvents in an amount from about 30% to about 90%, from about 40% to about 85%, from about 50% to about 85%, from about 50% to about 80%, or from about 40% to about 70% by weight;

iii) one or more binders in an amount from about 0.1% to about 50%, from about 0.1% to about 40%, from about 0.1% to about 35%, from about 0.5% to about 30%, from about 1% to about 25%, from about 2% to about 20%, or from about 3% to about 15% by weight; and iv) one or more surfactants in an amount from about 0.1% to about 30%, from about 0.1% to about 25%, from about 0.1% to about 20%, from about 0.5% to about 15%, or from 3 about % to about 10% by weight.

In some embodiments, the inkjet ink composition disclosed herein further comprises one or more additives.

In some embodiments, the inkjet ink compositions disclosed herein have viscosities ranging from about 1 mPa·s to about 25 mPa·s, from about 2 mPa·s to about 10 mPa·s, or from about 2.5 mPa·s to about 5.5 mPa·s. In certain embodiments, the inkjet ink compositions disclosed herein have electrical conductivities generally higher than 300 μS/cm, higher than 400 μS/cm, higher than 500 μS/cm, higher than 600 μS/cm, higher than 800 μS/cm, or higher than 1,000 μS/cm at 20° C.

The hollow composite particles act as a colorant in inkjet ink composition. In some embodiments, the hollow composite particles can be titanium dioxide hollow composite particles, zinc oxide hollow composite particles, titanium dioxide pigment, zinc oxide pigment, and combination thereof. A combination of one or more hollow composite particles and white pigment may also be used. In some embodiments, the amount of the hollow composite particles or a mixture of hollow composite particles and white pigments is less than 30%, less than 20%, less than 15%, less than 10%, less than 8%, less than 6%, or less than 5% by weight, based on the total weight of the inkjet ink composition.

Optional components may be added to the ink formulation to provide extra security of printing marks under any kinds of any physical or chemical trigger, for example fluorescent dye, rare earth elements so that the ink becomes visible under weak UV and IR irradiation. The optional component is generally less than 2%, or from about 0.05% to 0.8% by weight, based on the total weight of the inkjet ink composition.

The inkjet ink composition can be prepared by any suitable method, for example, by mixing all required ingredients at room temperature or upon heating and filtering the ink solution to remove any undesirable materials.

In some embodiments, the inkjet ink composition comprises:

(i) one or more hollow composite particles in an amount from about 15% to about 30% by weight;

(ii) one or more ink solvents in an amount from about 40% to about 70% by weight;

(iii) one or more binders in an amount from about 0.1% to about 15% by weight;

(iv) one or more surfactants in an amount from about 0.1% to about 15% by weight; and (v) one or more additives in an amount from about 0.1% to about 15% by weight.

In some embodiments, the substrate comprises one or more polymers or a coating comprising one or more polymers. Some non-limiting examples of polymers include thermoplastics, thermosets and elastomers. In certain embodiments, the substrate is nonporous. In other embodiments, the substrate is pliable or moldable. In certain embodiments, the polymer is selected from the group consisting of polyolefins such as low density poly(ethylene) (LDPE), high density poly(ethylene) (HDPE), crosslinked poly(ethylene) (XLPE) and poly(propylene); ethylene vinyl acetate copolymers; polyethers such as poly(phenyl ether); styrenic polymers such as polystyrene, poly(methyl styrene); polyacrylates such as poly(methyl methacrylate), poly (butyl methacrylate); chlorinated polymers such as poly (vinyl chloride), poly(vinylidene chloride); polycarbonates; epoxy resins and combinations thereof.

In certain embodiments, the printing with the inkjet ink composition disclosed herein is done by using an inkjet printer such as a continuous inkjet printer in a production line. In some embodiments, the speed of the production line is from about 30 to about 50 meter/minute, from about 20 to about 60 meter/minute, from about 30 to about 50 meter/minute, or from about 35 to about 45 meter/minute. In some embodiments, the speed of the production line is at more than 10 meter/minute, more than 20 meter/minute, more than 30 meter/minute, more than 40 meter/minute, or more than 50 meter/minute.

In another aspect, provided herein is an inkjet ink composition comprising one or more hollow composite particles which provide outstanding thermal insulation property.

In another aspect, provided herein is an inkjet ink composition comprising one or more hollow composite particles which provide outstanding heat resistance up to 1200° C. with less than 50% weight loss.

In another aspect, the method disclosed herein produces opaque protective coating on a polymer substrate, wherein the inkjet ink composition comprises titanium dioxide and zinc oxide particles to provide outstanding weather resistance and excellent UV absorption properties. The coating can be prepared by first inkjet the ink on a substrate, followed by sintering the particles to form a protective coating.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The examples below demonstrate some embodiments in accordance with the present invention, but the invention is not limited to any of the examples disclosed herein.

Method of Making Titanium Dioxide Hollow Composite Particles

Titanium dioxide particles (0.5 g, commercially obtained from Aladdin, Shanghai, China) was added into 5 mL water and adjusted the pH with 2 M HCl to pH 2, followed by adding 30 μL of vinylacetate acid (commercially obtained from Acros). The above mixture (i.e., water phase) was sonicated with a power of 300 W for 5 minutes under ice bath. The emulsion was prepared by first mixing 80 μL of styrene (commercially obtained from Dickman), 80 μL of divinyl benzene (commercially obtained from Sigma-Aldrich), 160 μL of hexadecane (commercially obtained from Tokyo Chemical Industry) and about 40 mg of V65 initiator (commercially obtained from WAKO) to form an oil phase, followed by mixing with the water phase and homogenized at a speed of 20,000 rpm for 2 minutes using an IKA homogenizer (Model T 25, commercially obtained from IKA Works GmbH & Co. KG, Staufen, Germany), and subsequently subjected to ultrasonication with a power of 400 W for 10 minutes under an ice bath. The emulsion was then heated at about 55° C. to initiate the polymerization. After 12 hours of reaction, the titanium dioxide hollow composite particles were collected by centrifugation and then washed with ethanol. Finally, the titanium dioxide hollow composite particles were obtained after freeze-drying.

Characterization of the Hollow Composite Particles

The morphology of the hollow composite particles and the distribution of the inorganic particles were characterized with transmission electron microscopy (TEM, FEI TS12) operating at 120 kV. The TEM sample was prepared by first dropping a 0.1 mg/mL of hollow composite particle dispersion into a copper grid, followed by air drying before TEM characterization. The average particle size and size distribution of the hollow composite particles were determined by statistically counting the number of particles in TEM image using an ImageJ software.

To evaluate the integrity of the inorganic particles within the polymer crosslinked shell, the produced hollow composite particles were purified by repeated centrifugation (8000 g-force) and decantation process. The purified particles were then characterized with TEM.

Figure 2:
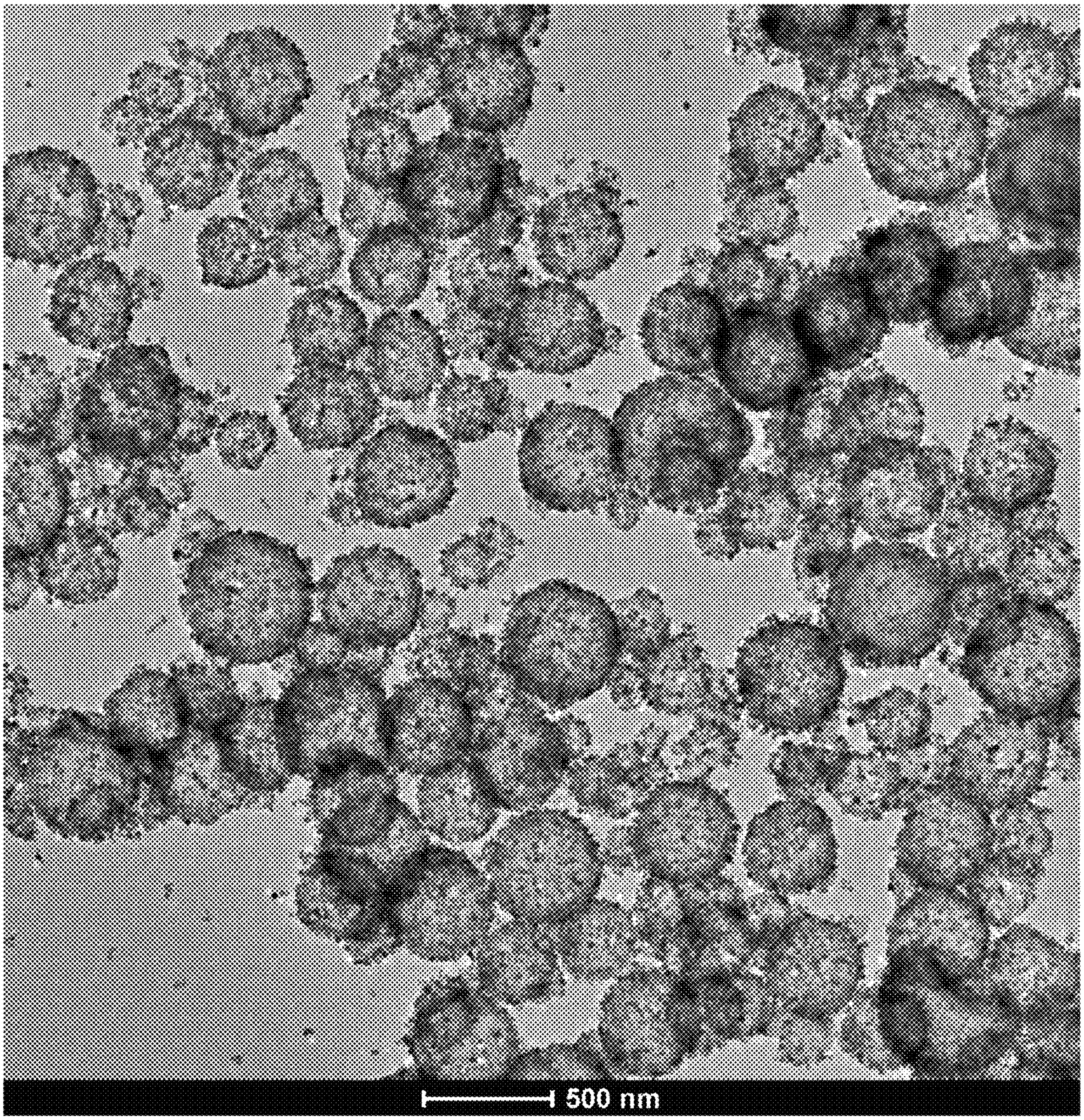
FIG. 2 depicts a TEM image of the purified hollow composite particles (Example C1) after repeated centrifugation and decantation.
Figure 3:
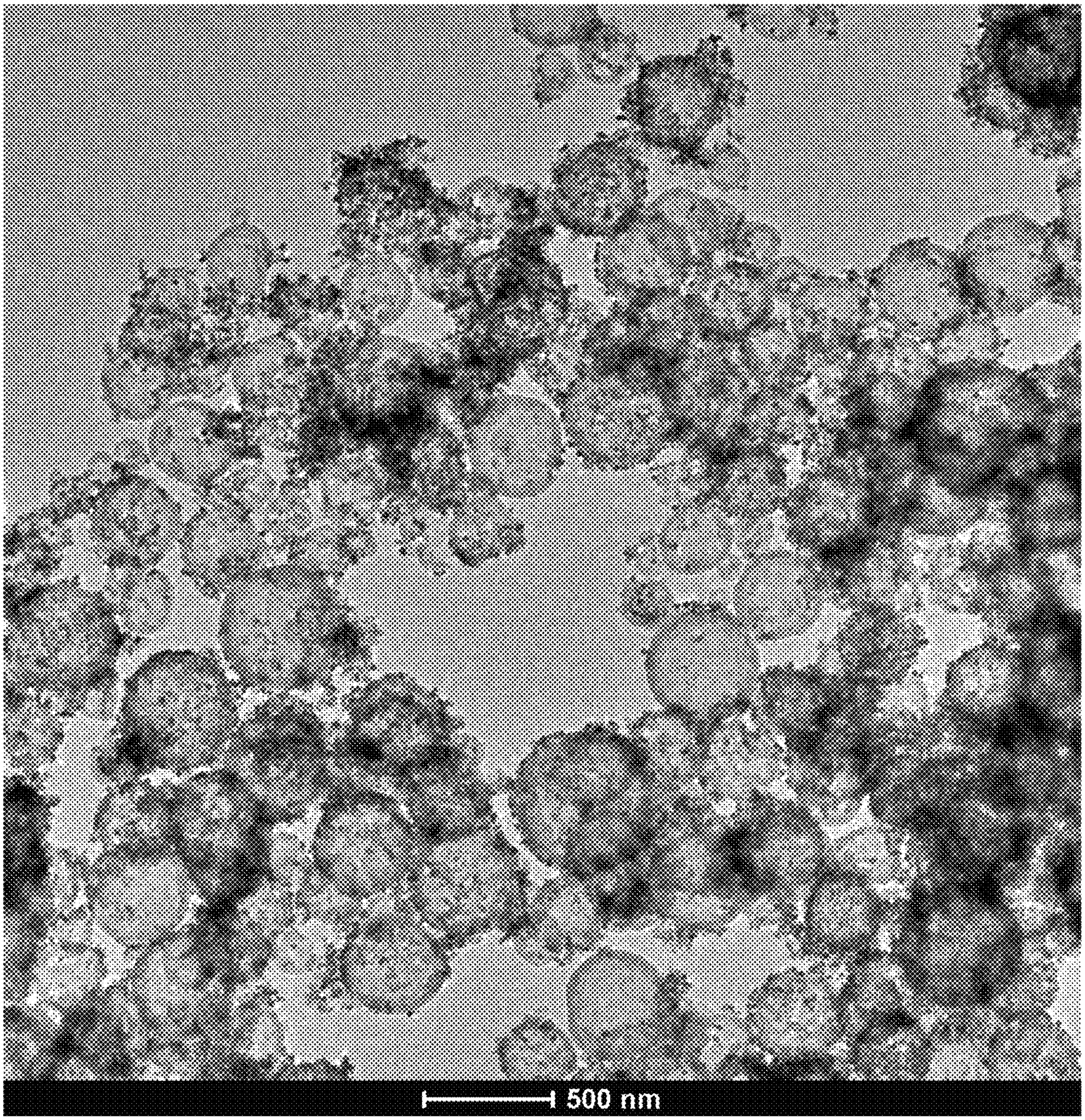
FIG. 3 depicts a TEM image of the purified hollow composite particles (Comparative Example C3) after repeated centrifugation and decantation.
Figure 4:
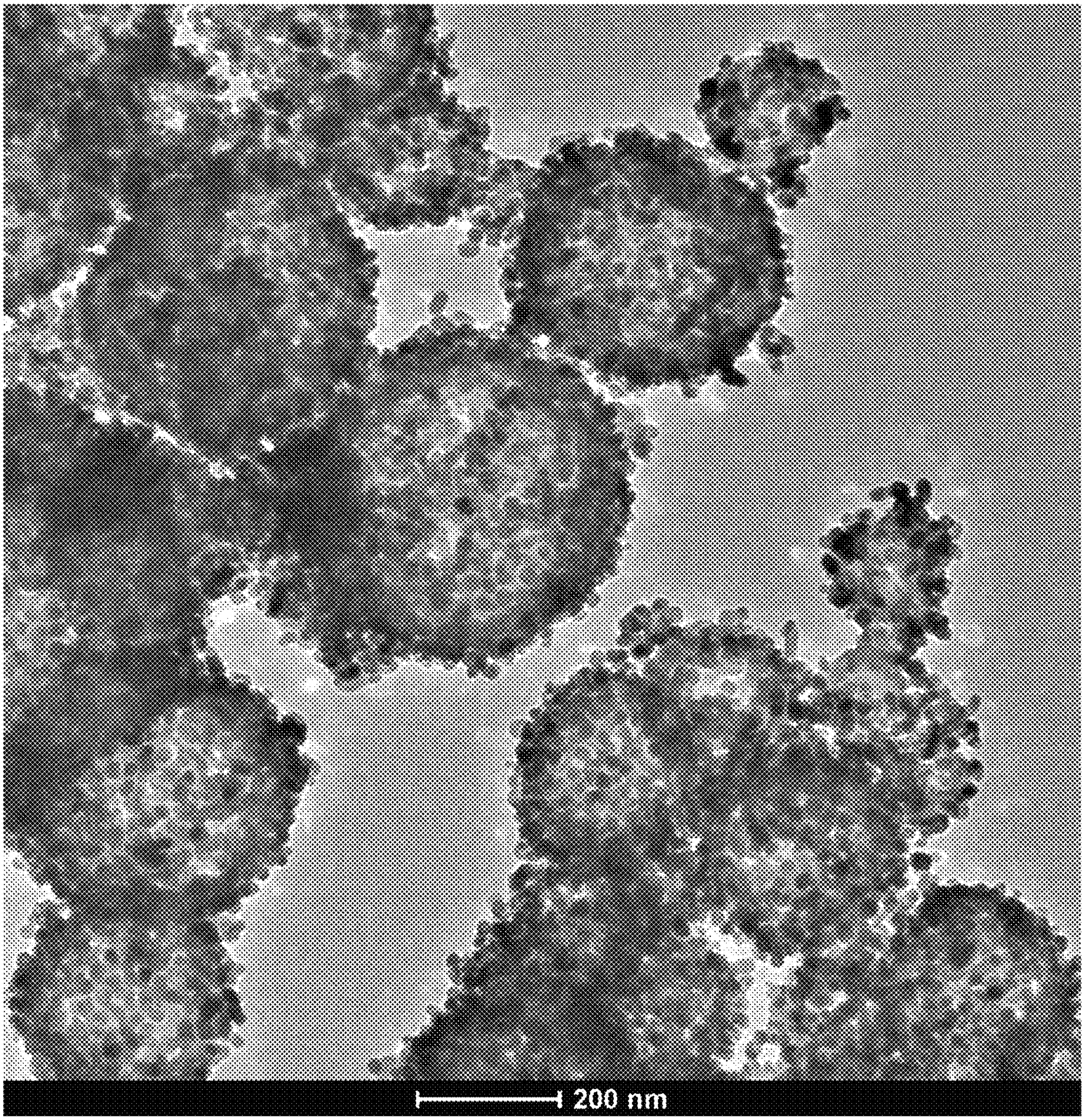
FIG. 4 depicts a TEM image of the SMA-stabilized hollow particles after shearing process.

To demonstrate the importance of the surface anchoring agent in the preparation of hollow composite particles, Example C1 and Comparative Examples C2 and C3 were prepared. Vinylacetic acid (VAA) was used for preparing Example C1, while no surface anchoring agent was used for Comparative Example C2 and (2-[2-(2-methoxyethoxy) ethoxy]acetic acid (MEEOA) was used for Comparative Example C3. Their formulations and TEM observations are shown in Table 1 below. Compared with Comparative Examples C2 and C3, Example C1 effectively prevents desorption of $TiO_2$ particles from the crosslinked polymer shells after repeated centrifugation and decantation process. The TEM images of Example C1 and Comparative Example C3 are shown in FIGS. 2 and 3 respectively, which show that there is significant $TiO_2$ detachment in Comparative Example C3 whereas there is no $TiO_2$ detachment in Example C1. Thus, hollow composite particles using VAA as a surface anchoring agent were used for subsequent study.

Examples C1-C3

TABLE 1

The integrity of the $TiO_2$ hollow composite particles ($TiO_2$ HCP), Example C1 and Comparative Examples C2 and C3, after subjected to centrifugation and decantation

| | Example C1 | Comp. Example C2 | Comp. Example C3 |
|---|---|---|---|
| Anatase $TiO_2$ (Aladdin) (g) | 0.5 | 0.5 | 0.5 |
| Styrene (mL) | 0.125 | 0.125 | 0.125 |
| DVB (mL) | 0.125 | 0.125 | 0.125 |
| VAA (mL) | 0.02 | 0 | 0 |
| MEEOA (mL) | 0 | 0 | 0.02 |
| Hexadecane (mL) | 0.25 | 0.25 | 0.25 |
| V65 (g) | 0.04 | 0.04 | 0.04 |
| Water (g) | 5 | 5 | 5 |
| TEM Observation | No $TiO_2$ detachment | No hollow sphere | $TiO_2$ detachment |

Examples C4-C7

Preparation and Characterization of Water-Based Coating

The water-based coatings of Examples C4-C7 were prepared by first dissolving a binder resin, i.e., JONCRYL® HPD 296 (commercially obtained from BASF), in water to form a binder solution, followed by dispersing respectively (1) no particles; (2) TRONOX® CR-826 rutile titanium dioxide pigment (commercially obtained from Tronox, Stamford, CT); (3) SUNSPHERES™ powder (commercially obtained from Dow Inc.); and (4) $TiO_2$ hollow composite particles, Example C1, into the binder solution under ultrasonication for 30 minutes using an ultrasonic bath (Power: 180 W; Frequency: 40 kHz).

The above mixtures were then casted respectively using a hand coater (K bar No. 8 100 μm clearance, commercially obtained from RK PrintCoat Instruments) on a black-and-white drawdown paper wherein the black side has a measured reflectance of 0.4% and the white side has a measured reflectance of 84%, followed by drying the sample coatings at room temperature for 12 hours. The lightness value L* of the sample coatings was measured on the black side of the drawdown paper using a Lovibond LC 100 Spectrocolorimeter based on the CIE 1976 LAB standard observer (10°) under D65 illuminant condition, and the hiding power was determined according to ASTM D2805-11.

Table 2 illustrates the whiteness and hiding power of the water-based coatings of Examples C4-C7. The data in Table 2 show that Example C5 (i.e., TRONOX® CR-826) has the highest whiteness and hiding power in the water-based coating system. However, Examples C7 (i.e., $TiO_2$ HCP) has slightly higher whiteness and hiding power than Examples C6 (i.e., SunSpheres). These results suggest that the presence of $TiO_2$ particles covered on the surface of hollow spheres is able to enhance hiding power of the hollow spheres.

TABLE 2

The whiteness and hiding power of water-based coatings of Examples C4-C7

| Examples | C4 Blank | C5 CR-826 | C6 SUNSPHERES ™ | C7 $TiO_2$ HCP |
|---|---|---|---|---|
| TRONOX ® CR-826 (g) | | 0.2 | | |
| SUNSPHERES ™ (g) | | | 0.2 | |
| Example C1 (g) | | | | 0.2 |
| JONCRYL ® HPD 296 (g) | 1.14 | 1.14 | 1.14 | 1.14 |
| Water (g) | 0.86 | 0.66 | 0.66 | 0.66 |
| Whiteness (L*) | 3.6 | 91.9 | 74.1 | 84.7 |
| Hiding Power ($m^2$/L) | 0.15 | 5.66 | 1.43 | 1.90 |

Examples C8-C20

Preparation and Characterization of Solvent-Based Dispersion and Coating

TRONOX® CR-826, SUNSPHERES™, and $TiO_2$ hollow composite particles were dispersed in a mixture of an organic solvent (i.e., methyl ethyl ketone) and two commercial binder resins, i.e., SMA 1440 (commercially obtained from Cray Valley) and JONCRYL® 611 (commercially obtained from BASF). The formulations of Examples C8-C20 are shown in Tables 3-5. The powder samples were respectively dispersed in the presence of SMA 1440 that was pre-dissolved in MEK with an IKA homogenizer (Model T 25, commercially obtained from IKA Works GmbH & Co. KG, Staufen, Germany) operating at a speed of 20,000 rpm for 10 minutes.

The dispersion stability of each of the inkjet ink compositions was evaluated in terms of sedimentation rate (mm/day) by first placing the inkjet ink composition (8 mL) in a 10 mL glass vial with an inner diameter of 14.77 mm, followed by measuring the height of the supernatant (turbidity <1,000 NTU) that was clearly separated from sediments at 24 hours interval for 1 week at ambient temperature or measuring the height of the supernatant until a clear separation reaches 30 mm at ambient temperature. A sample with a lower sedimentation rate was regarded as having a better dispersion stability.

The shearing stability of the dispersion was evaluated by the presence of any non-redispersable precipitates after the dispersion was subjected to a shearing rate at 1850 $s^{-1}$ for 10 minutes using a Brookfield DV3T rheometer with a CP40 Spindle.

Table 3 shows the dispersion stability and shearing stability of Examples C8-C11, wherein SMA 1440 was used as a surfactant. SMA 1440 is a derivative of styrene maleic anhydride copolymers, which is known as an effective surfactant for dispersing titanium dioxide due to its high acid value (acid number=185 mg KOH/mg). The data show that Example C10 (i.e., $TiO_2$ HCP) has a much better dispersion stability than Example C9 (i.e., SUNSPHERES™) and Example C8 (i.e., TRONOX® CR-826), while Example C10 has a better shearing stability than SUNSPHERES™ and has a shearing stability comparable to Example C8. Examples C10 and C11 illustrates the importance of VAA as a surface anchoring agent present in the hollow composite particles, which indicates that the presence of an appropriate surface anchoring agent in the synthesis of hollow composite particles provides beneficial effect on shearing stability. No desorption of $TiO_2$ particles from hollow composite particles was observed.

TABLE 3

The dispersion stabilities and shearing stabilities of Examples C8 and C11 using SMA 1440 as a surfactant

| Example | C8 CR-826 | C9 SUNSPHERES ™ | C10 $TiO_2$ HCP | C11 $TiO_2$ HCP03 |
|---|---|---|---|---|
| TRONOX ® CR-826 (g) | 1.0 | | | |
| SUNSPHERES ™ (g) | | 1.0 | | |
| $TiO_2$ HCP (i.e., with VAA) (g) | | | 1.0 | |
| $TiO_2$ HCP03 (i.e., without VAA) (g) | | | | 1.0 |
| SMA 1440 (g) | 1.0 | 1.0 | 1.0 | 1.0 |
| Methyl Ethyl Ketone (g) | 8.0 | 8.0 | 8.0 | 8.0 |
| Dispersion stability (mm/day) | 5.8 | 20.0 | 0.6 | 0.6 |
| Shearing stability | No precipitation | Precipitation | No precipitation | Precipitation |

To prepare the coatings, 0.1 mL of the above Examples C8 and C11 mixtures were first casted on a 18×18 mm cover glass (commercially obtained from Marienfeld Superior), and then dried at room temperature for 12 hours. The color determination was carried out by first placing dried film pre-casted on the cover glass over the black-and-white drawdown paper wherein the black side has a measured reflectance of 0.4% and the white side has a measured reflectance of 84%. The lightness value L* of the sample coatings was measured on the black side of the drawdown paper using a Lovibond LC 100 Spectrocolorimeter based on the CIE 1976 LAB standard observer (10°) under D65 illuminant condition, followed by determining the hiding power according to ASTM D2805-11.

Table 4 illustrates the whiteness and hiding power of Examples C12-C16 coatings. Example C15 (i.e., $TiO_2$ HCP with VAA) shows slightly higher whiteness and hiding power than Example C13 (i.e., TRONOX® CR-826) and significantly higher than Example C14 (i.e., SUNSPHERES™). It is worth noting that the hiding power of Example C15 is 6 times higher than Example C14. Such difference is significantly larger than that in the water-based coating system (i.e., Examples C6 and C7, as shown in Table 2), which may be attributed to the poor solvent resistance of the SUNSPHERES™, leading to partial dissolution of the materials and subsequent suppression of their hiding power. Such evidence is also supported by the poor dispersion stability and shearing stability of SUNSPHERES™ dispersion (i.e., Examples C9 and C10, as shown in Table 3). Table 4 also demonstrates that the presence of VAA in hollow composite particles provides beneficial effects on whiteness and hiding power. These results suggest that the integrity of the $TiO_2$ particles covered on hollow structure is a key to provide the hollow composite particles with a good shearing stability, whiteness and hiding power.

TABLE 4

The whiteness and hiding power of Examples C12-C16 coatings (using SMA 1440 as a binder resin)

| Example | C12 blank | C13 CR-826 | C14 SUNSPHERES ™ | C15 $TiO_2$ HCP | C16 $TiO_2$ HCP03 |
|---|---|---|---|---|---|
| TRONOX ® CR-826 (g) | | 1.0 | | | |
| SUNSPHERES ™ (g) | | | 1.0 | | |
| $TiO_2$ HCP (i.e., with VAA) (g) | | | | 1.0 | |
| $TiO_2$ HCP03 (i.e., without VAA) (g) | | | | | 1.0 |
| SMA 1440 (g) | 1.0 | 1.0 | 1.0 | 1.0 | 1.0 |
| Methyl Ethyl Ketone (g) | 9.0 | 8.0 | 8.0 | 8.0 | 8.0 |
| Whiteness (L*) | 41 | 93 | 70 | 93 | 83 |
| Hiding Power ($m^2$/L) | 0.13 | 1.47 | 0.27 | 1.68 | 0.74 |

To study the effect of acid value and the nature of surfactants on the performance of the solvent-based coating, a styrene-acrylic copolymer, JONCRYL® 611, having an acid value of 53 KOH/mg was studied (Table 5). Examples C17-C20 illustrate the whiteness and hiding power of the coating. It was found that Example C20 (i.e., JONCRYL® 611-stabilized $TiO_2$ HCP) displays lower hiding power than Example C15 (i.e., SMA-1440-stabilized $TiO_2$ HCP), whereas Example C18 (i.e., JONCRYL® 611-stabilized TRONOX® CR-826) has higher hiding power than Example C13 (i.e., SMA 1440-stabilized TRONOX® CR-826). These results suggest that the hiding power of the solvent-based coating depends on the structure of the particles.

TABLE 5

The whiteness and hiding power of Example C17-C20 dried coatings (using JONCRYL ® 611 as a binder resin)

| | C17 Blank | C18 CR-826 | C19 SUNSPHERES ™ | C20 $TiO_2$ HCP |
|---|---|---|---|---|
| TRONOX ® CR-826 (g) | | 0.2 | | |
| SUNSPHERES ™ (g) | | | 0.2 | |
| $TiO_2$ HCP (g) | | | | 0.2 |
| JONCRYL ® 611 (g) | 0.4 | 0.4 | 0.4 | 0.4 |
| Methyl Ethyl Ketone (g) | 1.6 | 1.6 | 1.6 | 1.6 |
| Whiteness (L*) | 7 | 95 | 67 | 89 |
| Hiding Power ($m^2$/L) | 0.035 | 2.54 | 0.35 | 0.94 |

Examples INK01-03

Preparation and Characterization of White Inkjet Ink Formulations Comprising $TiO_2$ Hollow Composite Particles and Traditional $TiO_2$ Particles The inkjet ink compositions INK01-03 were prepared as follows and their formulations are summarized in Table 6:

1) colorant particles (10 g), either titanium dioxide or titanium dioxide hollow composite particles, were first pre-dispersed in 40 g of a SMA solution containing 25 wt. % SMA 1440 and 75 wt. % methyl ethyl ketone to form a colorant dispersion.
2) a mixture of CAB-553-0.4 (1 g, commercially obtained from Eastman) and Paraloid B-82 (5 g, commercially obtained from DOW), tetrabutylammonium hexafluorophosphate (0.8 g) was dissolved in 43.2 g of methyl ethyl ketone to produce a resin solution.
3) The colorant dispersion and the resin solution were then mixed for 30 minutes under homogenization using an IKA homogenizer (commercially obtained from IKA Works GmbH & Co. KG, Staufen, Germany) at room temperature, and finally filtered to obtain an inkjet ink composition.

Properties of the inkjet ink compositions including conductivity, viscosity, hiding power, dispersion stability, shearing stability of the inkjet ink compositions were characterized according to the below measurement.

The conductivity of each of the inkjet ink compositions INK01-03 was measured by a conductivity meter using a 100 g of the inkjet ink composition. The conductivity meter was calibrated by an 84 μS/cm standard solution and a 1,413 μS/cm standard solution before the measurement.

The viscosity of each of the inkjet ink compositions INK01-03 was measured according to Lubrizol Test No. AATM105Ab using a Brookfield viscometer.

The dispersion stability of each of the inkjet ink compositions INK01-03 was evaluated in terms of sedimentation rate (mm/day) by first placing the inkjet ink composition (8 mL) in a 10 mL glass vial with an inner diameter of 14.77 mm, followed by measuring the height of the supernatant (turbidity <1,000 NTU) that is clearly separated from sediments at 24 hours interval for 1 week at ambient temperature or measuring the height of the supernatant until a clear separation reaches 30 mm at ambient temperature. A sample with a lower sedimentation rate can be regarded having a better dispersion stability.

The shearing stability of each of the inkjet ink compositions INK01-03 was evaluated by the presence of any non-redispersable precipitates after the dispersion was subjected to a shearing rate at 1850 $s^{-1}$ for 10 minutes using a Brookfield DV3T rheometer with a CP40 Spindle.

Table 6 shows that Example Ink01 has a better dispersion stability than Example Ink02 and has a shearing stability and a whiteness value comparable to Example Ink02. However, Example Ink01 has a lower hiding power than Example Ink02. Example Ink03 provides an illustrative Example combining a high dispersion stability comparable to $TiO_2$ HCP with a high hiding power comparable to TRONOX® CR-826, endowing an ink formulation with a superior balance between the hiding power and dispersion stability.

TABLE 6

The compositions and properties of inkjet ink compositions INK01-03.

| Example | Ink01 | Ink02 | Ink03 |
|---|---|---|---|
| SMA 1440-stabilized $TiO_2$ HCP-dispersion (g) | 50.0 | | 16.6 |
| SMA 1440-stabilized TRONOX ® CR-826 dispersion (g) | | 50.0 | 33.4 |
| Resin solution (g) | 50.0 | 50.0 | 50.0 |
| Total (g) | 100 | 100 | 100 |
| Properties of ink | | | |
| Conductivity (μS/cm) at 25° C. | 720.9 | 818.6 | 789.4 |
| Viscosity (mPa · s) at 25° C. | 8.8 | 5.8 | 6.8 |
| Dispersion stability (mm/day) | 0.8 | 1.7 | 1.3 |
| Shearing stability | No precipitation | No precipitation | No precipitation |
| Whiteness L* | 90 | 96 | 95 |
| Hiding Power ($m^2$/L) | 1.11 | 2.76 | 2.15 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A method of making hollow composite particles comprising the steps of:

a) forming a Pickering mini-emulsion by (i) mixing a mixture of one or more monomers, one or more crosslinkers, one or more oil-soluble initiators, and one or more hydrophobes to form an oil phase;

(ii) dispersing inorganic particles in an aqueous solution comprising one or more surface anchoring agents to form an aqueous phase, wherein the one or more surface anchoring agents are vinylacetic acid, acrylic acid, methacrylic acid or a combination thereof; and wherein the inorganic particles are bare inorganic particles, surface-modified inorganic particles, or a combination thereof; and (iii) emulsifying the oil phase in the aqueous phase using a dispersing device to form a stable emulsion comprising a plurality of oil droplets wherein the inorganic particles act as a stabilizer by assembling at the oil-water interface of the oil droplets; and b) polymerizing the one or more monomers, one or more surface anchoring agents, and one or more crosslinkers in the oil droplets to form the hollow composite particles.

2. The method of claim 1, wherein each of the hollow composite particles comprises the inorganic particles; a crosslinked polymer shell; and a hollow core inside the crosslinked polymer shell, and wherein the inorganic particles adhere on the surface of the crosslinked polymer shell.

3. The method of claim 1, wherein the dispersing device is an ultrasonication machine or a microfluidizer homogenizer.

4. The method of claim 1, wherein the one or more surface anchoring agents prevent desorption of inorganic particles from the oil droplets or the crosslinked polymer shell.

5. The method of claim 1, wherein the one or more surface anchoring agents are selected from vinylacetic acid, acrylic acid, and combinations thereof.

6. The method of claim 1, wherein the inorganic particles are titanium dioxide, surface-modified titanium dioxide or a combination thereof.

7. The method of claim 1, wherein the mixture in step a) (i) further comprises one or more oil soluble dyes.

8. Hollow composite particles prepared by the method of claim 1.

9. The hollow composite particles of claim 8, wherein the inorganic particles are titanium dioxide, surface-modified titanium dioxide or a combination thereof, and wherein the average diameter of the hollow composite particles is from about 200 nm to about 1,000 nm.

10. Hollow composite particles prepared by the method of claim 7, wherein the one or more oil soluble dyes are inside the hollow core.

11. An inkjet ink composition comprising:

a) a colorant comprising the hollow composite particles of claim 8 or a combination of the hollow composite particles and traditional pigment particles;

b) an ink solvent;

c) a binder;

d) one or more surfactants; and e) an additive.

12. The inkjet ink composition of claim 11, wherein the hollow composite particles comprise white inorganic particles adhering on the surface of the crosslinked polymer shell, and wherein the white inorganic particles are titanium dioxide, surface-modified titanium dioxide or a combination thereof.

13. The inkjet ink composition of claim 11, wherein the average diameter of the hollow composite particles is from about 200 nm to about 1,000 nm.

14. The inkjet ink composition of claim 11, wherein the binder is a functional polymer.

15. The inkjet ink composition of claim 11, wherein the colorant is present in an amount from about 0.1% to about 30% by weight, based on the total weight of the inkjet ink composition.

16. The inkjet ink composition of claim 11, wherein the ink solvent is selected from the group consisting of ketones, alcohols, esters, and combinations thereof.

17. The inkjet ink composition of claim 11, wherein the ink solvent is present in an amount from about 50% to about 85% by weight, based on the total weight of the inkjet ink composition.

18. The inkjet ink composition of claim 11, wherein the binder is present in an amount from about 0.1% to about 35% by weight, based on the total weight of the inkjet ink composition.

19. The inkjet ink composition of claim 11, wherein the one or more surfactants are present in an amount from about 0.1% to about 15% by weight, based on the total weight of the inkjet ink composition.

20. The inkjet ink composition of claim 11, wherein the additive is selected from the group consisting of plasticizers, surfactants, light stabilizers, defoaming agents, antioxidants, UV stabilizers, bactericides, conducting agents, rub resistance agents, and combinations thereof.

* * * * *